(12) United States Patent
Mikashima et al.

(10) Patent No.: US 11,718,091 B2
(45) Date of Patent: Aug. 8, 2023

(54) METHOD OF ADJUSTING TIMING OF INK EJECTION ON AN INKJET RECORDING APPARATUS

(71) Applicant: KYOCERA Document Solutions Inc., Osaka (JP)

(72) Inventors: Katsuo Mikashima, Osaka (JP); Yuichiro Kurokawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 284 days.

(21) Appl. No.: 17/365,640

(22) Filed: Jul. 1, 2021

(65) Prior Publication Data

US 2022/0009228 A1 Jan. 13, 2022

(30) Foreign Application Priority Data

Jul. 7, 2020 (JP) ................................. 2020-116785

(51) Int. Cl.
*B41J 2/045* (2006.01)
*H04N 1/00* (2006.01)

(52) U.S. Cl.
CPC ....... *B41J 2/04573* (2013.01); *B41J 2/04586* (2013.01); *H04N 1/0057* (2013.01); *H04N 1/00734* (2013.01); *H04N 1/00745* (2013.01); *H04N 1/00795* (2013.01); *H04N 2201/0082* (2013.01)

(58) Field of Classification Search
CPC .......... B41J 2/04508; B41J 2/04573; B41J 2/04586; H04N 2201/0082; H04N 1/0057; H04N 1/00734; H04N 1/00745; H04N 1/00795
See application file for complete search history.

(56) References Cited

U.S. PATENT DOCUMENTS

| | | | |
|---|---|---|---|
| 9,162,441 B1 * | 10/2015 | Noda | B41J 2/2132 |
| 2006/0023049 A1 | 2/2006 | Koike et al. | 347/104 |
| 2021/0138785 A1 * | 5/2021 | Okada | B41J 2/16532 |

FOREIGN PATENT DOCUMENTS

| | | |
|---|---|---|
| JP | 2001-113690 A | 4/2001 |
| JP | 2005-96116 A | 4/2005 |
| JP | 2006-21399 A | 1/2006 |

* cited by examiner

*Primary Examiner* — Thinh H Nguyen
(74) *Attorney, Agent, or Firm* — Stein IP, LLC

(57) ABSTRACT

An ink ejection timing adjustment method on an inkjet recording apparatus includes an information acquiring step of acquiring at least recording medium information with a reading sensor, a printing step of printing a test pattern on a recording medium on a conveying belt, a calculating step of calculating a delay time by adding to a default set time a correction time corresponding to a correction value for ink ejection timing entered based on the printed position of the test pattern, and a setting step of setting the delay time as a predetermined time at the lapse of which after, as a result of the conveying belt turning, an opening passes a reading position a recording head starts to eject ink to the opening.

9 Claims, 19 Drawing Sheets

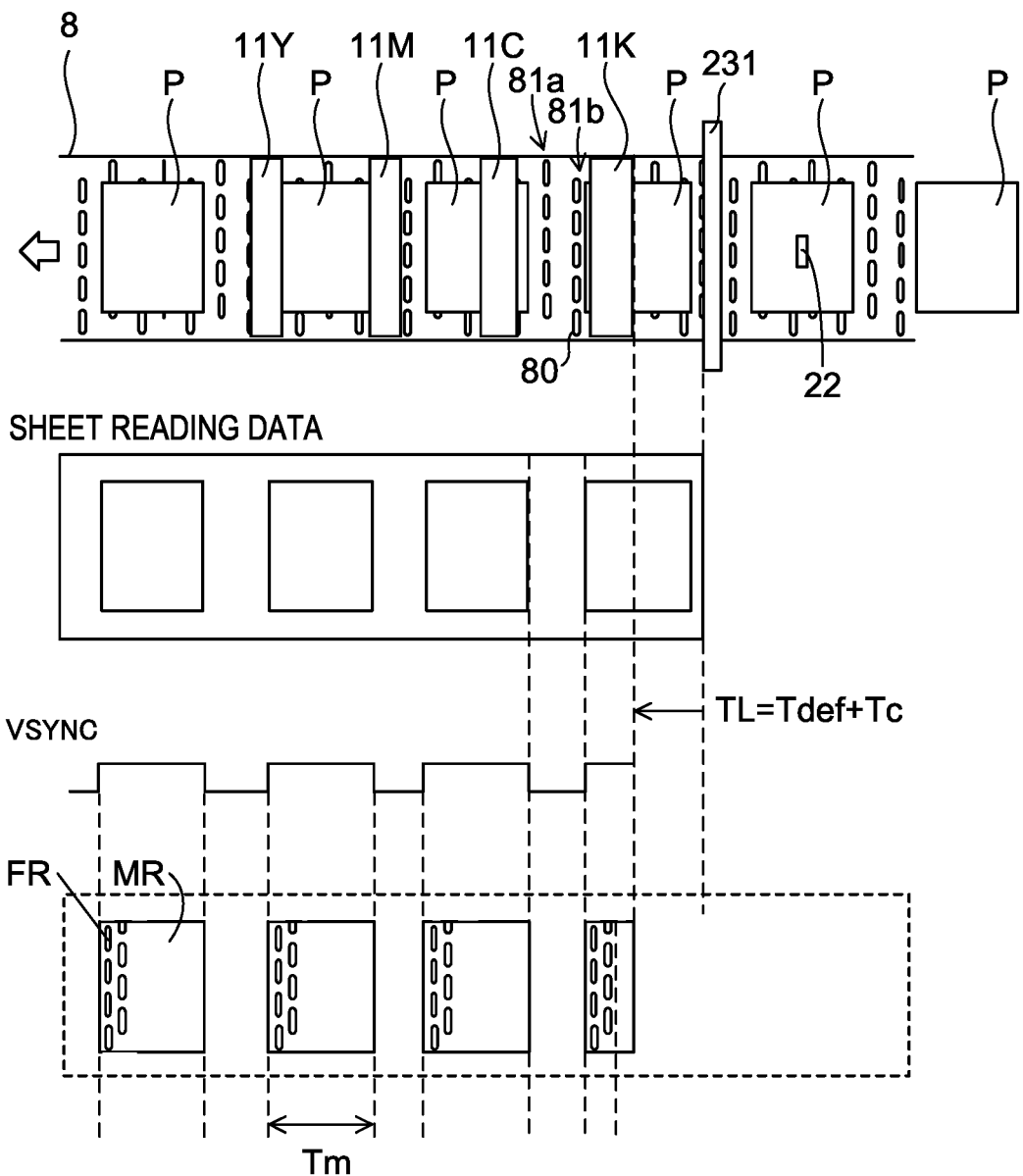

METHOD OF ADJUSTING TIMING OF INK EJECTION ON AN INKJET RECORDING APPARATUS

INCORPORATION BY REFERENCE

This application is based on and claims the benefit of Japanese Patent Application No. 2020-116785 filed on Jul. 7, 2020, the contents of which are hereby incorporated by reference.

BACKGROUND

The present disclosure relates to a method of adjusting the timing of ink ejection on an inkjet recording apparatus.

On an inkjet recording apparatus such as an inkjet printer, when quick-drying ink is used, as the ink dries, its increased viscosity makes the nozzles in a recording head more likely to clog. As a precaution, before printing on sheets, it is necessary to perform operation to eject and dispose of ink with increased viscosity. Operation for ejecting ink that will not contribute to image formation on sheets will herein be referred to as flushing (blank ejection).

Some known techniques for flushing are as follows. According to one known configuration, between one sheet after another fed onto a conveying belt (in what is called a sheet-to-sheet interval), ink is ejected from a recording head so as to be passed through an opening provided in the conveying belt, and thereby flushing is achieved. The position of the opening in the conveying belt is sensed by an opening sensor, and based on its sensing result, where to eject ink for flushing is controlled.

According to another known configuration, a hole sized to correspond to a unit recording head constituting a recording head is provided in a conveying belt. In this construction, ink is ejected toward the hole, and thereby flushing is achieved. On the inner circumference side of the conveying belt, a capping means or a cleaning means is provided. The capping means or the cleaning means can move, through the hole, closer to and away from the ink ejection surface of the recording head. While no image is being formed, the conveying belt is stopped, and through the hole, the capping means is moved so as to cap the nozzles in the recording head. In this way, the ink inside the nozzles can be prevented from drying. Or, while no image is being formed, the conveying belt is stopped, and through the hole, the cleaning means is moved so as to clean the ink ejection surface of the recording head. In this way, the ink ejection surface can be cleaned of soil.

If a sheet is placed so as to overlap an opening in a conveying belt, the sheet sags, making the distance (gap) from a recording head to the sheet uneven. This may degrade the quality of the image recorded on the sheet. In this respect, by feeding a sheet onto the conveying belt so as not to overlap the opening, it is possible to suppress a degradation in the quality of the recorded image resulting from a sag in the sheet as mentioned above.

SUMMARY

According to one aspect of the present disclosure, a method of adjusting the timing of ejection of ink on an inkjet recording apparatus includes: an information acquiring step of, using a single reading sensor that reads an opening formed in a conveying belt to acquire opening information in a first reading mode and that reads a recording medium fed onto the conveying belt to acquire recording medium information in a second reading mode, acquiring at least the recording medium information with the reading sensor; a printing step of, after, as a result of the conveying belt turning, the leading end of the recording medium detected based on the recording medium information passes the reading position of the reading sensor, when a default set time previously set as the time taken to convey the recording medium between the reading sensor and a recording head elapses, making the recording head eject ink to print a test pattern on the recording medium on the conveying belt; a calculating step of, by adding to the default set time a correction time corresponding to a correction value for ink ejection timing entered based on the printed position of the test pattern, calculating a delay time; and a setting step of setting the delay time as a predetermined time at the lapse of which after, as a result of the conveying belt turning, the opening passes the reading position the recording head starts to eject ink to the opening.

This and other objects of the present disclosure, and the specific benefits obtained according to the present disclosure, will become apparent from the description of embodiments which follows.

BRIEF DESCRIPTION OF THE DRAWINGS

FIG. 19 is an illustrative diagram schematically showing recording medium information acquired by yet another example of the ink ejection timing adjustment method.

DETAILED DESCRIPTION

To perform flushing, it is necessary to acquire information on an opening formed in a conveying belt (e.g., information on the shape, size, position of the opening), and to do that requires a sensor for reading such information on the opening. On the other hand, to perform image formation by ejection of ink onto a sheet, it is necessary to acquire information on the sheet fed onto the conveying belt (e.g., information on the size of the sheet and its position on the conveying belt), and to do that requires a sensor for reading such information on the sheet.

Inconveniently, a construction that requires separate sensors, one for reading information on an opening (hereinafter referred to also as "opening information") and another for reading information on a sheet (hereinafter referred to also as "recording medium information"), may hinder cost reduction in an inkjet recording apparatus. Preferable is therefore a construction that uses a single reading sensor that doubles as a sensor for reading opening information and a sensor for reading a recording medium information.

Inconveniently, the reading sensor allows for fitting tolerance, and thus in a construction that uses a single reading sensor, the distance between the reading sensor and a recording head varies among inkjet recording apparatuses. Thus, under the condition that the movement speed of the conveying belt (the conveyance speed of sheets) is equal, the conveyance time of a sheet between the reading sensor and the recording head varies among inkjet recording apparatuses. Accordingly, setting the same time (default set time) as the just-mentioned conveyance time uniformly on different inkjet recording apparatuses may on some inkjet recording apparatuses result in, when the recording head performs flushing in which it ejects ink to an opening based on the default set time, the ejected ink diverging off the opening and landing around the opening, soiling the conveying belt.

An object of the present disclosure is to provide, for use on an inkjet recording apparatus that acquires opening information and recording medium information with a single reading sensor, an ink ejection timing adjustment method that allows accurate adjustment of ink ejection timing (ejection position) with consideration given to the fitting tolerance of the reading sensor and that can thereby reduce the likelihood of, during flushing in which ink is ejected to an opening in a conveying belt, the ink, due to the fitting tolerance of the reading sensor, landing around the opening and soiling the conveying belt.

[1. Construction of an Inkjet Recording Apparatus]

Hereinafter embodiments of the present disclosure will be described with reference to the accompanying drawings.

First a description will be given of an inkjet recording apparatus to which an ink ejection timing adjustment method according to the present disclosure is applicable.

Figure 1:
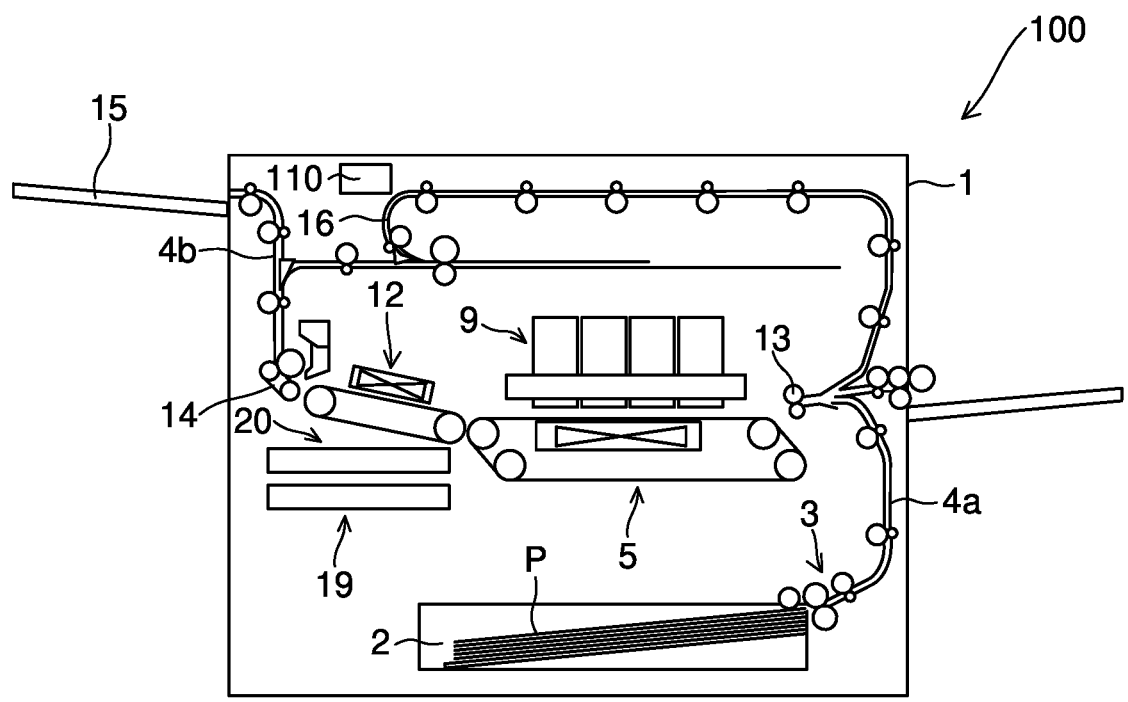
FIG. 1 is an illustrative diagram showing an outline of the construction of a printer as an inkjet recording apparatus according to one embodiment of the present disclosure.

FIG. 1 is an illustrative diagram showing an outline of the construction of a printer 100 as an inkjet recording apparatus according to an embodiment of the present disclosure. The printer 100 includes a sheet feed cassette 2 as a sheet storing portion. The sheet feed cassette 2 is disposed in a lower part inside a printer main body 1. Inside the sheet feed cassette 2, sheets P as one example of a recording medium are stored.

Downstream of the sheet feed cassette 2 in the sheet conveying direction, that is, to the upper right of the sheet feed cassette 2 in FIG. 1, a sheet feeding device 3 is disposed. The sheet feeding device 3 feeds out sheets P, one by one separately, to the upper right of the sheet feed cassette 2 in FIG. 1.

The printer 100 includes, inside it, a first sheet conveying passage 4a. The first sheet conveying passage 4a is located to the upper right of the sheet feed cassette 2, that is, in its sheet feed direction. A sheet P fed out from the sheet feed cassette 2 is conveyed through the first sheet conveying passage 4a, vertically upward along a side surface of the printer main body 1.

At the downstream end of the first sheet conveying passage 4a in the sheet conveying direction, a pair of registration rollers 13 is provided. Closely downstream of the pair of registration rollers 13 in the sheet conveying direction, a first conveying unit 5 and a recording portion 9 are disposed. The sheet P fed out from the sheet feed cassette 2 passes through the first sheet conveying passage 4a and reaches the pair of registration rollers 13. The pair of registration rollers 13, while correcting skewed feeding of the sheet P and coordinating with the ink ejection operation performed by the recording portion 9, feeds out the sheet P toward the first conveying unit 5 (in particular a first conveying belt 8, described later). Thus, the pair of registration rollers 13 constitutes a recording medium feeding portion that feeds a sheet P onto the first conveying belt 8. A whole part upstream of the pair of registration rollers 13 in the sheet conveying direction may constitute the recording medium feeding portion.

The sheet P fed into the first conveying unit 5 by the pair of registration rollers 13 is conveyed by the first conveying belt 8 to a position opposite the recording portion 9 (in particular recording heads 17a to 17c (see FIG. 2), described later). From the recording portion 9, ink is ejected onto the sheet P, so that an image is recorded on the sheet P. At this time, the ejection of ink in the recording portion 9 is controlled by a control device 110 within the printer 100.

Downstream of (in FIG. 1, to the left of) the first conveying unit 5 in the sheet conveying direction, a second conveying unit 12 is disposed. The sheet P having an image recorded on it by the recording portion 9 is fed to the second conveying unit 12. During the passage through the second conveying unit 12, the ink ejected onto the surface of the sheet P is dried.

Downstream of the second conveying unit 12 in the sheet conveying direction, near the left side surface of the printer main body 1, a decurler portion 14 is provided. The sheet P having the ink on it dried by the second conveying unit 12 is fed to the decurler portion 14, where a curl that has developed in the sheet P is corrected.

Downstream of (in FIG. 1, over) the decurler portion 14 in the sheet conveying direction, a second sheet conveying passage 4b is provided. The sheet P that has passed through the decurler portion 14, when it is not subjected to duplex recording, passes through the second sheet conveying passage 4b and is discharged onto a sheet discharge tray 15 provided outside the left side surface of the printer 100.

In an upper part of the printer main body 1, over the recording portion 9 and the second conveying unit 12, a reverse conveying passage 16 for duplex recording is provided. When duplex recording is performed, a sheet P having recording on its one side (first side) finished and having passed through the second conveying unit 12 and the decurler portion 14 passes through the second sheet conveying passage 4b to be fed to the reverse conveying passage 16.

The sheet P fed to the reverse conveying passage 16 has its conveying direction switched for subsequent recording on its other side (second side). Then the sheet P passes rightward across an upper part of the printer main body 1 so that the sheet P then passes through the pair of registration rollers 13 and is fed, with the second side up, once again to the first conveying unit 5. In the first conveying unit 5, the sheet P is conveyed to a position opposite the recording portion 9, and from the recording portion 9, ink is ejected so that an image is formed on the second side. The sheet P having undergone duplex recording passes through the second conveying unit 12, the decurler portion 14, and the second sheet conveying passage 4b in this order and is discharged onto the sheet discharge tray 15.

Under the second conveying unit 12, a maintenance unit 19 and a capping unit 20 are disposed. When purging is performed, the maintenance unit 19 moves horizontally to under the recording portion 9, where the maintenance unit 19 wipes off and collects the ink forced out of ink ejection apertures in the recording heads. Purging denotes operation in which ink is forcibly blown out of the ink ejection apertures in the recording heads to discharge ink with increased viscosity, foreign matter, and air bubbles out of the ink ejection apertures. When capping is performed on the ink ejection surface of the recording heads, the capping unit 20 moves horizontally to under the recording portion 9 and then moves up to be fitted on the bottom surface of the recording heads.

Figure 2:
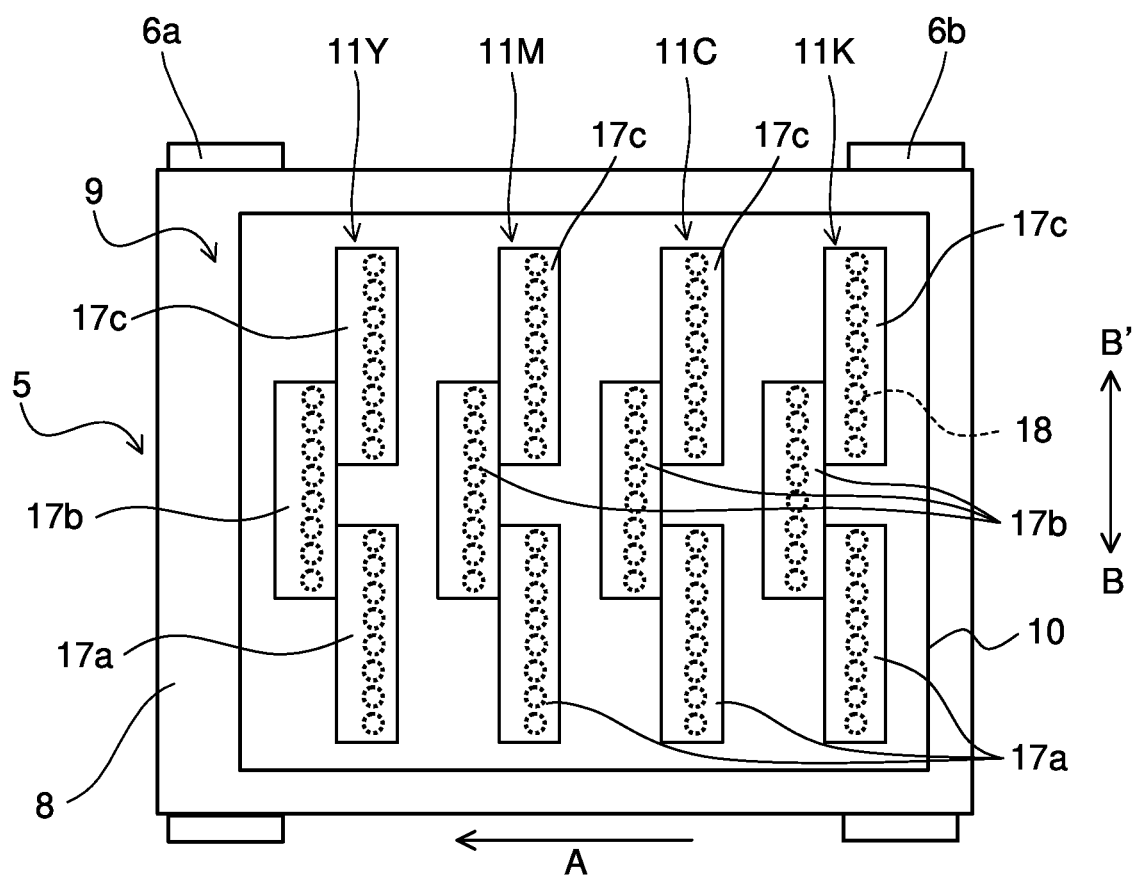
FIG. 2 is a plan view of a recording portion in the printer.

FIG. 2 is a plan view of the recording portion 9. The recording portion 9 includes a head housing 10 and line heads 11Y, 11M, 11C, and 11K. The line heads 11Y to 11K are held on the head housing 10 at such a height as to leave a predetermined gap (e.g., 1 mm) from the conveying surface of a first conveying belt 8 that is an endless belt stretched around a plurality of rollers. The plurality of rollers include a driving roller 6a, a driven roller 6b, and tension rollers 7a and 7b (see FIG. 3). The driving roller 6a makes the first conveying belt 8 turn in the conveying direction (the direction indicated by arrow A) of sheets P. The driving of the driving roller 6a is controlled by a main control portion 110a (see FIG. 4) in the a control device 110. The plurality of rollers just mentioned are disposed in the following order along the turning direction of the first conveying belt 8: the tension roller 7a, the tension roller 7b, the driven roller 6b, and the driving roller 6a (see FIG. 3).

The line heads 11Y to 11K each include a plurality of (here, three) recording heads 17a to 17c. The recording heads 17a to 17c are disposed in a staggered array along the sheet width direction (the direction indicated by arrows BB') orthogonal to the sheet conveying direction (the direction indicated by arrow A). The recording heads 17a to 17c have a plurality of ink ejection apertures 18 (nozzles). The ink ejection apertures 18 are disposed at equal intervals in the width direction of the recording heads, that is, in the sheet width direction (the direction indicated by arrows BB'). From the line heads 11Y to 11K, through the ink ejection apertures 18 in the recording heads 17a to 17c, ink of different colors, namely yellow (Y), magenta (M), cyan (C), and black (K) respectively, is ejected toward a sheet P conveyed on the first conveying belt 8.

Figure 3:
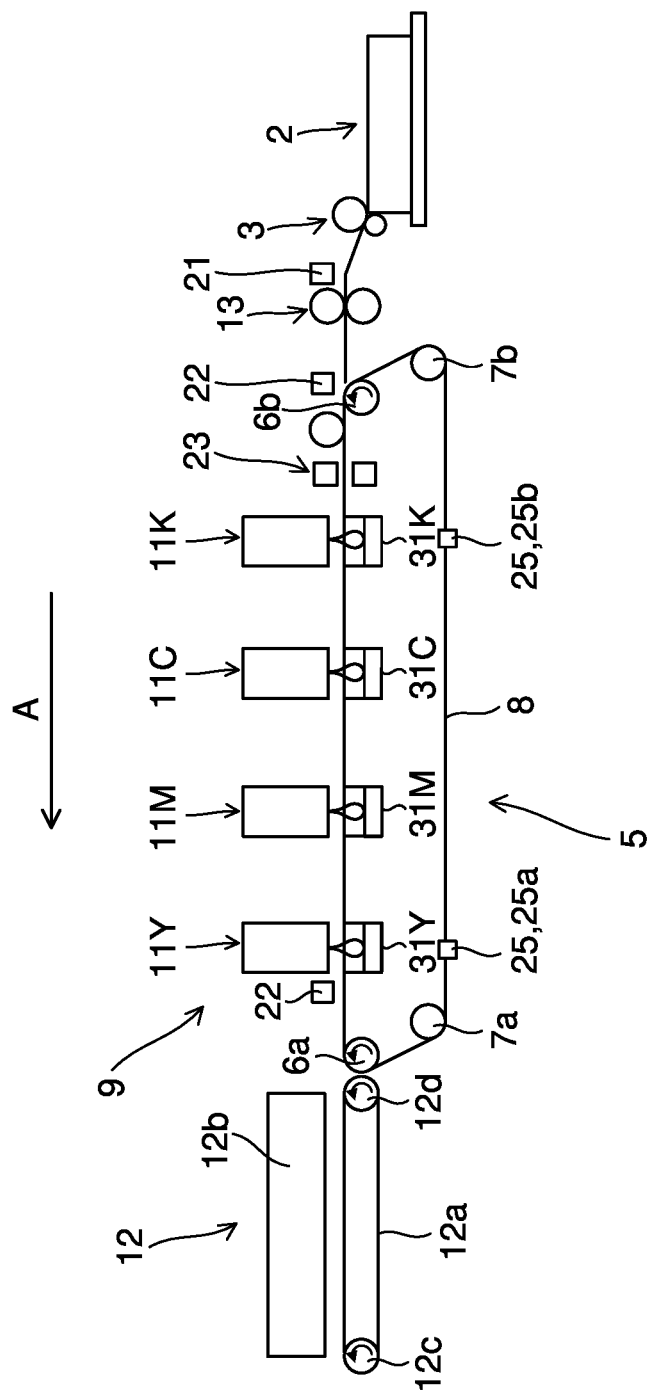
FIG. 3 is an illustrative diagram schematically showing a construction around a sheet conveying passage in the printer, leading from a sheet feed cassette via a first conveying unit to a second conveying unit.
Figure 4:
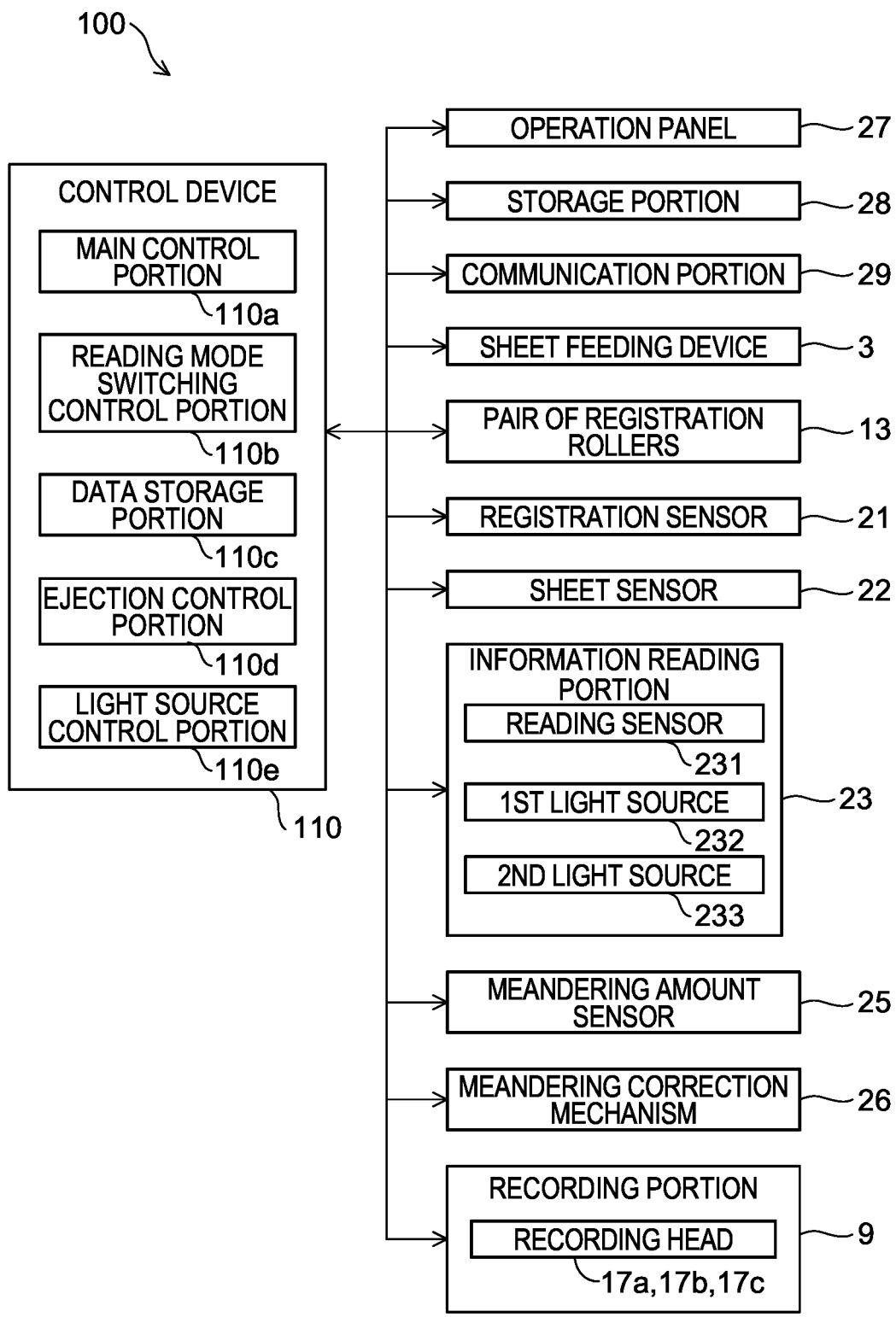
FIG. 4 is a block diagram showing a hardware configuration of a principal portion of the printer.

FIG. 3 schematically shows a construction around the conveying passage for sheets P that leads from the sheet feed cassette 2 via the first conveying unit 5 to the second conveying unit 12. FIG. 4 is a block diagram showing a hardware configuration of a principal portion of the printer 100. The printer 100 includes, in addition to the components already mentioned above, a registration sensor 21, a sheet sensor 22, an information reading portion 23, a meandering amount sensor 25, and a meandering correction mechanism 26. The information reading portion 23 will be described in detail later.

The registration sensor 21 senses a sheet P that is conveyed out of the sheet feed cassette 2 by the sheet feeding device 3 to be fed to the pair of registration rollers 13. The registration sensor 21 is located upstream of the pair of registration rollers 13 with respect to the feeding direction of the sheet P. Based on the sensing result from the registration sensor 21, the main control portion 110a, described later, of the control device 110 can control the timing with which the pair of registration rollers 13 starts to rotate. For example, based on the sensing result from the registration sensor 21, the main control portion 110a can control the timing with which a sheet P having undergone skew (skewed feeding) correction by the pair of registration rollers 13 is fed to the first conveying belt 8.

The sheet sensor 22 is a recording medium sensor that senses (the timing of) the passage of the leading end of the sheet P fed from the pair of registration rollers 13 to the first conveying belt 8. That is, the sheet sensor 22 senses the sheet P that is fed onto the first conveying belt 8. The sheet sensor 22 is located upstream of the information reading portion 23 in the sheet conveying direction. The sheet sensor 22 can be a transmissive or reflective optical sensor, a CIS sensor (contact image sensor), or the like.

In the embodiment, another sheet sensor 22 for sensing the passage of a sheet P is disposed further downstream of the most downstream line head 11Y; this one may be omitted.

The meandering amount sensor 25 senses the amount of meandering of the first conveying belt 8. The amount of meandering denotes the amount of displacement of the first conveying belt 8 from a reference position in the belt width direction. The meandering amount sensor 25 can be, for example, a contact or non-contact displacement sensor that senses the amount of meandering by sensing the displacement of a side surface (one side) of the first conveying belt 8. The meandering amount sensor 25 can instead be a CIS sensor that is elongate in the belt width direction.

The meandering amount sensor 25 is provided at a plurality of places along the turning direction of the first conveying belt 8. More specifically, as shown in FIG. 3, the meandering amount sensor 25 includes a first meandering amount sensor 25a and a second meandering amount sensor 25b. The first meandering amount sensor 25a is located downstream of the tension roller 7a in the turning direction of the first conveying belt 8, and the second meandering amount sensor 25b is located further downstream of the first meandering amount sensor 25a, upstream of the tension roller 7b.

The meandering correction mechanism 26 shown in FIG. 4 is a mechanism that corrects meandering of the first conveying belt 8 by inclining the rotary shaft of a roller (e.g., the tension roller 7b in FIG. 3) around which the first conveying belt 8 is stretched. Based on the amount of meandering of the first conveying belt 8 sensed by the meandering amount sensor 25, the main control portion 110*a* controls the meandering correction mechanism 26. Thereby the meandering of the first conveying belt 8 is corrected.

The printer 100 further includes an operation panel 27, a storage portion 28, and a communication portion 29.

The operation panel 27 is an operation portion that accepts various setting inputs. For example, a user can operate the operation panel 27 to input information on the size of sheets P stored in the sheet feed cassette 2. For another example, a user can operate the operation panel 27 to input the number of sheets P to be printed on and to enter an instruction to start a print job. For a further example, a worker or the like who works on the printer 100 in the factory where it is manufactured or a serviceperson who maintains the printer 100 after it has been put on the market can operate the operation panel 27 to make various settings and adjustments on the printer 100.

The storage portion 28 is a memory that stores operation programs for the control device 110 as well as various kinds of information, and can include a ROM (read-only memory), a RAM (random-access memory), a nonvolatile memory, and the like. For example, information set on the operation panel 27 is stored in the storage portion 28.

The communication portion 29 is a communication interface for exchange of information with the outside (e.g., a personal computer (PC)). For example, when a user operates the PC to transmit image data along with a print command to the printer 100, the image data and the print command are fed via the communication portion 29 to the printer 100. In the printer 100, a ejection control portion 110*d*, described later, controls the recording heads 17*a* to 17*c* according to the image data to make them eject ink, and thereby an image can be recorded on a sheet P.

As shown in FIG. 3, the printer 100 has, on the inner circumference side of the first conveying belt 8, ink receiving portions 31Y, 31M, 31C, and 31K. The ink receiving portions 31Y to 31K are provided at positions opposite the recording heads 17*a* to 17*c* of the line heads 11Y to 11K across the first conveying belt 8. When the recording heads 17*a* to 17*c* are made to perform flushing, the ink receiving portions 31Y to 31K receive and collect the ink ejected from the recording heads 17*a* to 17*c* and passed through openings 80 in the first conveying belt 8. Here, flushing denotes ejecting ink from the ink ejection apertures 18 with timing different from the timing for ink ejection that contributes to image formation (image recording) on a sheet P with an aim to reduce or prevent the clogging of the ink ejection apertures 18 resulting from ink drying. The ink collected in the ink receiving portions 31Y to 31K is, for example, delivered to a waste ink tank to be disposed of, but may instead be reused instead of being disposed of.

The second conveying unit 12 mentioned previously includes a second conveying belt 12*a* and a drier 12*b*. The second conveying belt 12*a* is stretched around two rollers, namely a driving roller 12*c* and a driven roller 12*d*. The sheet P conveyed by the first conveying unit 5 and having an image recorded on it by ink ejection by the recording portion 9 is conveyed by the second conveying belt 12*a*, and is dried by the drier 12*b* while being conveyed, to be conveyed then to the decurler portion 14 mentioned above.

[2. Details of a First Conveying Belt]

Figure 5:
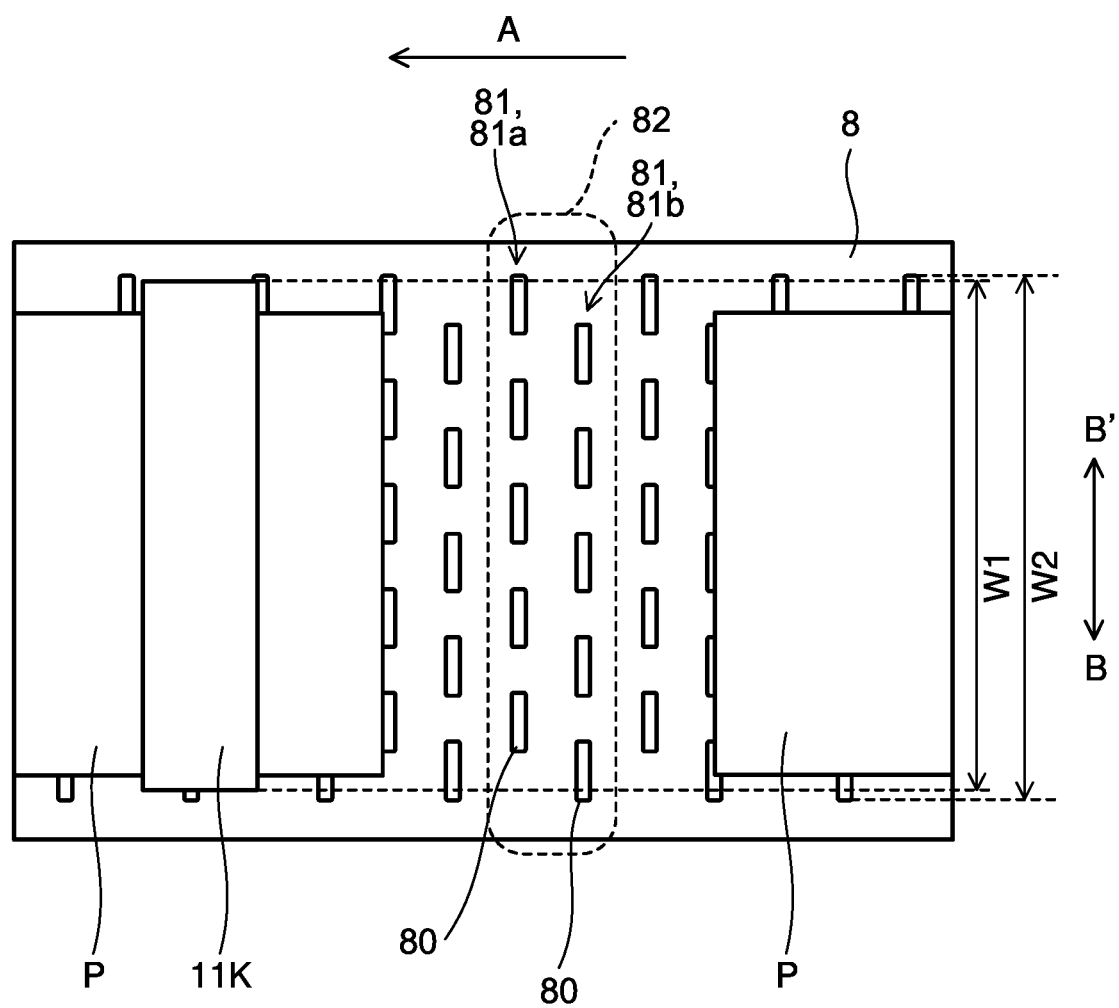
FIG. 5 is a plan view showing one example of the structure of a first conveying belt in the first conveying unit.

Next, the first conveying belt 8 in the first conveying unit 5 will be described in detail. FIG. 5 is a plan view showing one example of the structure of the first conveying belt 8.

The first conveying belt 8, which conveys sheets P successively, has a plurality of openings 80. The openings 80 are each a hole that is elongate in the belt width direction (the direction indicated by arrows BB'). The openings 80 are each, as seen in a plan view, in a rectangular shape as shown in FIG. 5 in the embodiment, but may instead be in a rectangular shape with rounded corners or any other shape (e.g., elliptical).

In the embodiment, sheets P are conveyed in a state sucked onto the first conveying belt 8 by negative-pressure suction; that is, a negative-pressure suction system is adopted. The openings 80 double as suction holes to let through suction air produced by negative-pressure suction.

In the embodiment, the first conveying belt 8 has several groups of openings 82, each including a plurality of openings 80, disposed at predetermined intervals in the sheet conveying direction (the direction indicated by arrow A). Each group of openings 82 includes a plurality of rows of openings 81, and in the embodiment includes two rows of openings 81*a* and 81*b*.

The rows of openings 81*a* and 81*b* each include a plurality of openings 80 at equal intervals in the belt width direction (the direction indicated by arrow BB'). The openings 80 in one row of openings 81*a* are disposed to overlap the openings 80 in the other row of openings 81*b* as seen from the conveying direction of sheets P (the direction indicated by arrow A). That is, in the first conveying belt 8, the plurality of openings 80*s* are disposed in a staggered array. The intervals between the groups of openings 82 in the just-mentioned conveying direction are equal to the intervals between the rows of openings 81*a* and 81*b* in the just-mentioned conveying direction.

In each group of openings 82, the number of openings 80 in one row of openings 81*a* and the number of openings 80 in the other row of openings 81*b* are equal. Instead, the number of openings 80 in one row of openings 81*a* may be one greater than the number of openings 80 in the other row of openings 81*b*. In that case, the openings 80 in the first conveying belt 8 are formed at positions in line-symmetry about the middle line running along the middle of the first conveying belt 8 in the belt width direction.

Here, when the head width of the line heads 11Y to 11K (recording heads 17*a* to 17*c*) is represented by W1 (mm), then in the first conveying belt 8, the maximum width W2 (mm) of the region in the belt width direction in which the openings 80 are formed is greater than the head width W1. Thus, when the recording heads 17*a* to 17*c* perform flushing, the ink ejected from the ink ejection apertures 18 in the recording heads 17*a* to 17*c* inevitably passes through either the openings 80 in the row of openings 81*a* or the openings 80 in the row of openings 81*b*. Thus the recording heads 17*a* to 17*c* can be made to perform flushing over the entire head width so that clogging resulting from ink drying can be reduced with respect to all the ink ejection apertures 18.

[3. Information Reading Portion]

Figure 6:
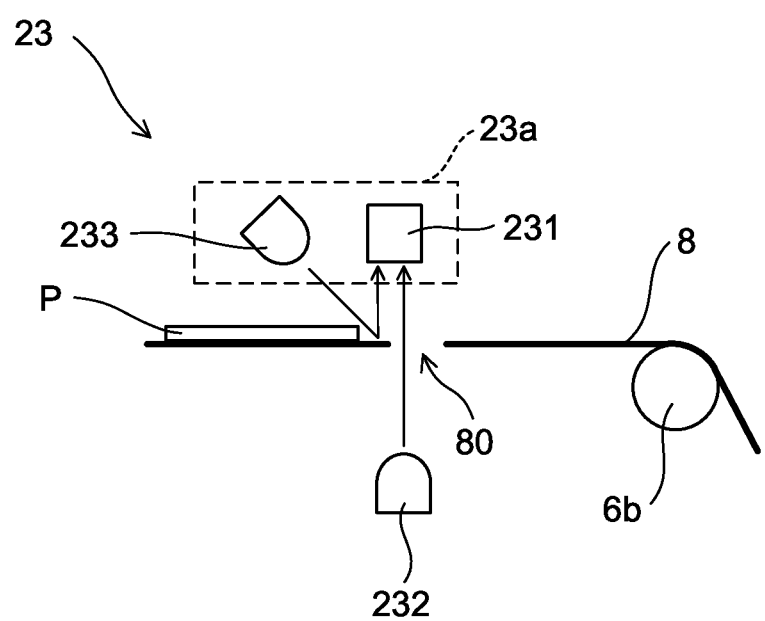
FIG. 6 is an illustrative diagram schematically showing one example of the construction of an information reading portion in the printer.

Next, the information reading portion 23 mentioned previously will be described. FIG. 6 is an illustrative diagram schematically showing one example of the construction of the information reading portion 23. The information reading portion 23 reads information on the openings 80 formed in the first conveying belt 8 and information on the sheet P fed onto the first conveying belt 8. Here, the information on the openings 80 includes information on at least one of the shape, size, and position (in the conveying direction and in the belt width direction) of the openings 80 in the first conveying belt 8. On the other hand, the information on the sheet P includes information on at least one of the size (shape, dimensions) and the position (in the conveying direction and in the belt width direction) of the sheets P fed onto the first conveying belt 8. Accordingly, for example, even if a sheet P on the first conveying belt 8 is located at a position displaced from the regular position in the belt width direction, position information on it is acquired by the information reading portion 23. The information reading portion 23 is provided, with respect to the sheet conveying direction, upstream of the recording portion 9, downstream of the sheet sensor 22.

As shown in FIGS. 4 and 6, the information reading portion 23 includes a reading sensor 231, a first light source 232, and a second light source 233. The reading sensor 231 reads, in a first reading mode, information on the openings 80 in the first conveying belt 8 and, in a second reading mode, information on the sheet P on the first conveying belt 8. The reading sensor 231 is, for example, a CIS sensor that is elongate along the belt width direction of the first conveying belt 8. The reading mode (first or second reading mode) of the reading sensor 231 is controlled by a reading mode switching control portion 110*b* (see FIG. 4), described later, in the control device 110.

The reading sensor 231 is located on that side of the first conveying belt 8 on which a sheet P is placed (the side facing the recording heads 17*a* to 17*c*). The first light source 232 is located on the side of the first conveying belt 8 opposite from the reading sensor 231. The first light source 232 includes, for example, LEDs (light-emitting diodes) as point light sources arrayed along the width direction of the first conveying belt 8.

Of the light emitted from the first light source 232, the part that enters the openings 80 in the first conveying belt 8 is transmitted through the openings 80 to reach the reading sensor 231. On the other hand, the part of the light emitted from the first light source 232 which strikes outside the openings 80 is absorbed or intercepted by the first conveying belt 8, and thus does not reach the reading sensor 231. Accordingly the reading sensor 231 can, by receiving the light emitted from the first light source 232 and transmitted through the openings 80, acquire information on the shape and the like of the openings 80.

A threshold value (e.g., a first threshold value) may be set for the amount of light received by the reading sensor 231 when the first light source 232 is lit so that, based on how light is being received when the amount of light received is equal to or larger than the threshold value, the reading sensor 231 acquires information on the openings 80 in the first conveying belt 8. In that case, even if, for the sake of discussion, any part of the light emitted from the first light source 232 is transmitted through a region of the first conveying belt 8 elsewhere than the openings 80, that part of the light can be excluded as light that does not contribute to information on the openings 80. Thus the reading sensor 231 can accurately acquire information on the openings 80.

The second light source 233 is located on the same side of the first conveying belt 8 as the reading sensor 231 (on the side at which the sheet P is placed). The second light source 233 includes, for example, LEDs as point light sources arrayed along the belt width direction.

Of the light emitted from the second light source 233, the part that strikes the sheet P on the first conveying belt 8 is reflected from the sheet P to reach, as reflected light (e.g., diffusely reflected light), the reading sensor 231. On the other hand, the part of the light emitted from the second light source 233 which strikes a region on the first conveying belt 8 elsewhere than the sheet P is absorbed by the first conveying belt 8 or is transmitted as it is through the openings 80, and thus does not reach the reading sensor 231. Thus the reading sensor 231 can, by receiving the part of the light emitted from the second light source 233 and reflected from the sheet P, acquire information on the size and position of the sheet P.

A threshold value (e.g., a second threshold value) may be set for the amount of light received by the reading sensor 231 while the second light source 233 is lit so that, based on how light is received when the amount of light is equal to or larger than the threshold value, the reading sensor 231 acquires information on the sheet P on the first conveying belt 8. In that case, even if, for the sake of discussion, any part of the light emitted from the second light source 233 is reflected from a region of the first conveying belt 8 elsewhere than the sheet P to strike the reading sensor 231, this part of the light can be excluded as light that does not contribute to information on the sheet P. Thus the reading sensor 231 can acquire accurately information on the sheet P.

In the embodiment, the reading sensor 231 and the second light source 233 are provided on the same chassis so as to be consolidated into a reading unit 23*a*. Instead, the reading sensor 231 and the second light source 233 may be provided on separate chassis.

[4. Control Device]

As shown in FIG. 4, the printer 100 of the embodiment further includes a control device 110. The control device 110 includes, for example, a CPU (central processing unit) and a memory. Specifically, the control device 110 includes a main control portion 110*a*, a reading mode switching control portion 110*b*, a data storage portion 110*c*, an ejection control portion 110*d*, and a light source control portion 110*e*. The control device 110 may further include a calculation portion that performs necessary calculations and a time counting portion that counts time, or a part (for example, the main control portion 110*a*) of the control device 110 may double as a calculation portion and a time counting portion as just mentioned. The main control portion 110*a* controls the operation of different parts in the printer 100.

The reading mode switching control portion 110*b* switches the reading mode of the above-mentioned reading sensor 231 in the information reading portion 23 between the first and second reading modes. More specifically, the reading mode switching control portion 110*b* switches between the first and second reading modes alternately every integral multiple of the formation period for one dot as the unit of resolution of the image. For example, in a case where the resolution of the image is 600 dpi (dots per inch), the reading mode switching control portion 110*b* switches between the first and second reading modes alternately every formation period for one dot at 600 dpi. In this case, the reading sensor 231 can acquire information on the openings 80 and information on the sheet P each at 300 dpi. One dot as mentioned above can be formed by ejection of at least one droplet of ink.

The data storage portion 110*c* temporarily stores the information acquired by the reading sensor 231 (i.e., information on the openings 80 and information on the sheet P), flushing data, described later, generated in the ejection control portion 110*d*, and the like. The data storage portion 110*c* can be, for example, a RAM or a nonvolatile memory. The information acquired by the reading sensor 231 may instead be stored in the storage portion 28 (see FIG. 4) mentioned previously.

Based on at least one of the information on the openings 80 and the information on the sheet P read by the reading sensor 231, the ejection control portion 110*d* controls the ejection of ink from the recording heads 17a to 17c. For example, based on the information on the openings 80, the ejection control portion 110d generates data (flushing data) to be passed through the openings 80 during flushing, and makes the recording heads 17a to 17c perform flushing based on the generated flushing data. For another example, based on the information on the sheet P, the ejection control portion 110d controls the recording heads 17a to 17c to make them eject ink from the ink ejection apertures 18 corresponding the region of the sheet P and thereby form an image on the sheet P.

Figure 7:
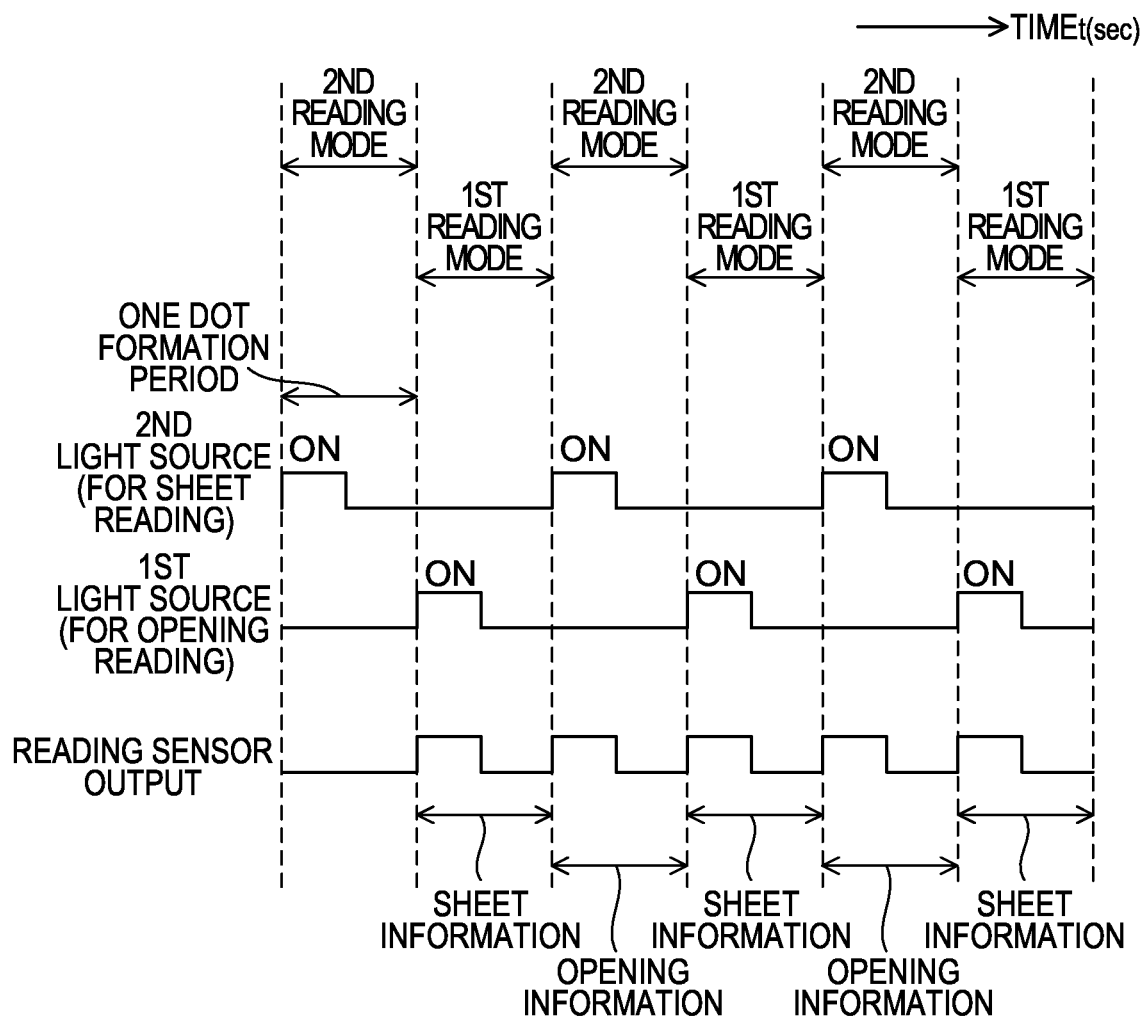
FIG. 7 is an illustrative diagram showing one example of the timing of lighting of a first and a second light source in the information reading portion.

Based on the reading mode of the reading sensor 231, which is switched by the reading mode switching control portion 110b, the light source control portion 110e controls the lighting of the first and second light sources 232 and 233. For example, FIG. 7 is an illustrative diagram showing one example of the timing of the lighting of the first and second light sources 232 and 233. As shown there, the light source control portion 110e lights the first light source 232 when the reading sensor 231 is in the first reading mode, and lights the second light source 233 when the reading sensor 231 in in the second reading mode. Accordingly, in the first reading mode, the reading sensor 231 can acquire information on the openings 80 based on how the light emitted from the first light source 232 is being received, and in the second reading mode, the reading sensor 231 can acquire information on the sheet P based on how the light emitted from the second light source 233 is being received.

There is a time lag after the first light source 232 starts going out until it becomes completely dark. Thus, if the time interval between the lit period of the first light source 232 in the first reading mode and the lit period of the second light source 233 in the second reading mode is too short, in the second reading mode the light emitted from the first light source 232 may reach the reading sensor 231 and be sensed by it erroneously.

To avoid that, in the embodiment, the light source control portion 110e controls the lighting of the first light source 232 such that the lit period of the first light source 232 in the first reading mode is about one half of the entire period of the first reading mode. Thus, as the extinguished period of the first light source 232 in the first reading mode, about one half of the entire period of the first reading mode is secured. This gives a sufficiently long time interval between the lit period of the first light source 232 in the first reading mode and the subsequent lit period of the second light source 233 in the second reading mode. It is thus possible to avoid erroneous sensing by the reading sensor 231 in the second reading mode.

Out of similar considerations, the light source control portion 110e controls the lighting of the second light source 233 such that the lit period of the second light source 233 in the second reading mode is about one half of the entire period of the second reading mode. Thus, as the extinguished period of the second light source 233 in the second reading mode, about one half of the entire period of the second reading mode is secured. This gives a sufficiently long time interval between the lit period of the second light source 233 in the second reading mode and the subsequent lit period of the first light source 232 in the first reading mode. It is thus possible to avoid erroneous sensing by the reading sensor 231 in the first reading mode.

The reading sensor 231 is configured such that, in the reading mode (period) subsequent to the reading mode (period) in which the first or second light source 232 or 233 is lit, the reading sensor 231 outputs the information acquired in the preceding reading mode. For example, in a case where, as shown in FIG. 7, the reading sensor 231 acquires information on the sheet P by the lighting of the second light source 233 in the second reading mode, in the subsequent reading mode, that is, in the first reading mode, the reading sensor 231 outputs information on the sheet P. For another example, in a case where the reading sensor 231 acquires information on the openings 80 by the lighting of the first light source 232 in the first reading mode, in the subsequent reading mode, that is, in the second reading mode, the reading sensor 231 outputs information on the openings 80. Thus also the output of the reading sensor 231 is switched alternately in accordance with the reading mode.

[5. Operation]

Next, the operation of the printer 100 according to the embodiment will be described. It is here assumed that in preparation for the operation described below the timing of ink ejection from the recording heads 17a to 17c has been adjusted properly with consideration given to the fitting tolerance of the reading sensor 231. An ink ejection timing adjustment method that takes the fitting tolerance of the reading sensor 231 into account will be described in detail later.

Figure 8:
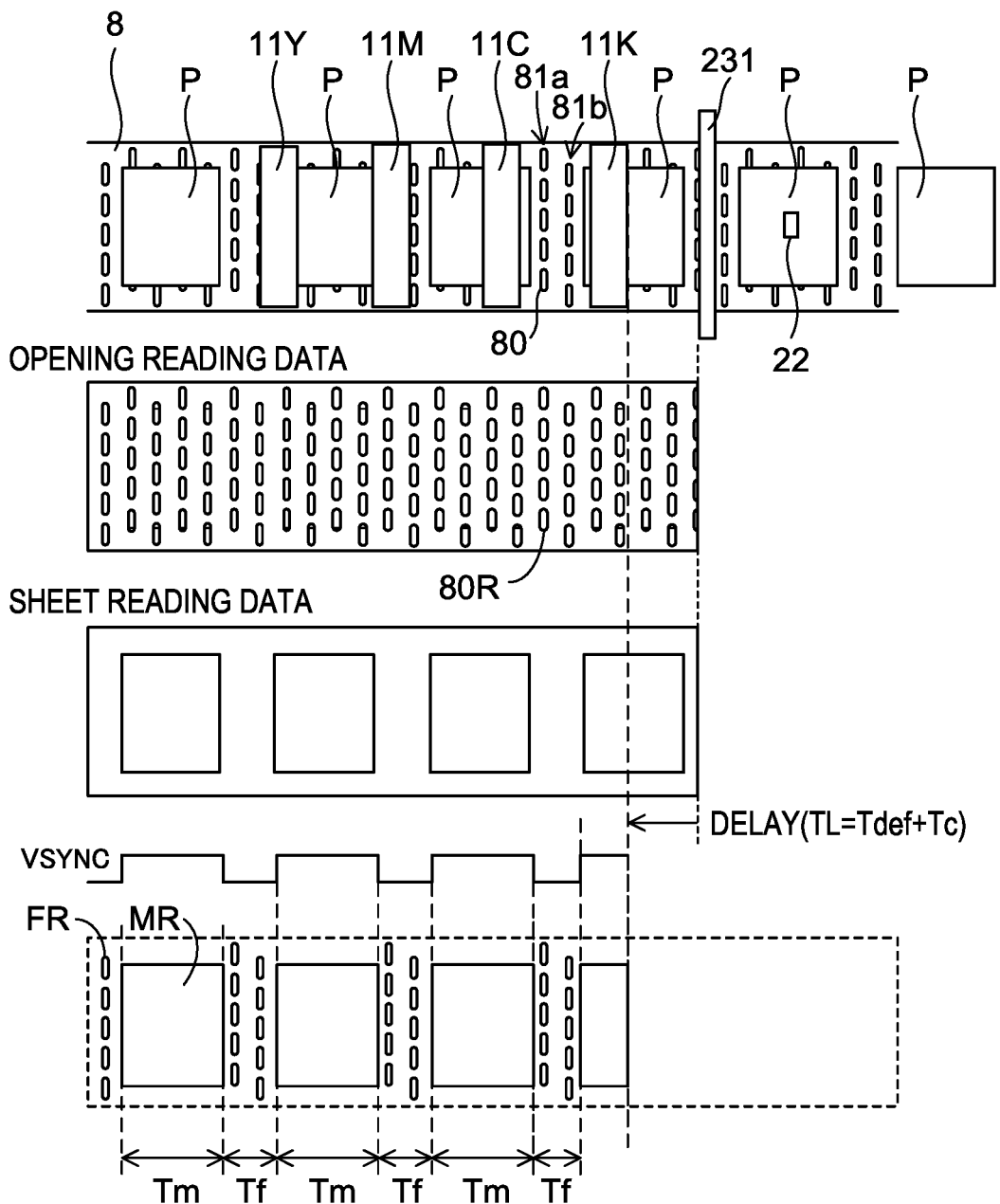
FIG. 8 is an illustrative diagram schematically showing opening reading data and sheet reading data acquired by a reading sensor in the information reading portion along with ink ejection regions with respect to the first conveying belt.

FIG. 8 schematically shows information on the openings 80 (opening reading data) and information on the sheet P (sheet reading data) that are acquired by the reading sensor 231 along with ink ejection regions with respect to the first conveying belt 8. The ink ejection regions include flushing regions FR and image formation regions MR, both described later.

(5-1. Sensing a Sheet)

First, a sheet P is conveyed from the pair of registration rollers 13 toward the first conveying belt 8. When the sheet sensor 22 senses the passage of the sheet P, the sheet sensor 22 outputs a sense signal (vertical synchronizing signal VSYNC) with respect to the sheet P. The sense signal is a signal that stays at high level during a period in which the sheet P is being sensed and that stays at low level during a period in which the sheet P is not being sensed.

(5-2. Reading Openings and a Sheet)

Subsequently, when the sheet P is fed onto the first conveying belt 8, the reading sensor 231 reads the shape, size, and position of the openings 80 in the first conveying belt 8 to acquire opening reading data that contains information on the openings 80. The reading sensor 231 also reads the size and position of the sheet on the first conveying belt 8 to acquire sheet reading data that contains information on the sheet P. The reading sensor 231 is assumed to be a sensor capable of monochrome reading at 600 dpi.

Meanwhile the reading mode switching control portion 110b switches the reading mode of the information reading portion 23 alternately between the first and second reading modes at the period of one dot (one line) of resolution in the conveying direction. Moreover, under the control of the light source control portion 110e, the first and second light sources 232 and 233 are lit alternately at the period of one dot in accordance with the reading mode of the reading sensor 231 (as shown in FIG. 7).

Thus, in the first reading mode, based on how the light emitted from the first light source 232 is being received, the reading sensor 231 can acquire opening reading data (e.g., 300 dpi). Moreover, in the second reading mode, based on how the light emitted from the second light source 233 is being received, the reading sensor 231 can acquire sheet reading data (e.g., 300 dpi).

Here, of the light emitted from the first light source 232, only the part that has entered the openings 80 passes through them to reach the reading sensor 231. Thus the reading sensor 231 yields, as the opening reading data, binary data in which, as shown in FIG. 8, regions of the openings 80 in the first conveying belt 8 are white (indicated by no hatching) and the region other than the openings 80 is black (indicated by hatching). The acquired opening reading data is stored in the data storage portion 110*c*.

On the other hand, of the light emitted from the second light source 233, most of the part that strikes the sheet P on the first conveying belt 8 to be diffusely reflected from it reaches the reading sensor 231, and the part that strikes any other region (e.g., the part of the first conveying belt 8 other than where the sheet P lies) is absorbed by the first conveying belt 8 so that most of this part of the light does not reach the reading sensor 231. Thus the reading sensor 231 yields, as the sheet reading data, binary data in which, as shown in FIG. 8, the region of the sheet P on the first conveying belt 8 is white (indicated by no hatching) and the region other than sheet P is black (indicated by hatching). The acquired sheet reading data is stored in the data storage portion 110*c*.

(5-3. Generating Flushing Data)

Next, the ejection control portion 110*d* generates flushing data according to which to make the recording heads 17*a* to 17*c* eject ink toward the openings 80 which are located at positions deviated in the conveying direction from the sheet P on the first conveying belt 8. This will now be discussed in detail.

<Recognizing Sheet-Interval Openings in Opening Reading Data>

First, the ejection control portion 110*d* reads the opening reading data from the data storage portion 110*c*. Here, it is assumed that the timing of the start of the reading of the opening reading data is the timing delayed from the negate timing of the sense signal (VSYNC) from the sheet sensor 22 by the time (hereinafter referred to simply as "conveyance time") taken to convey the sheet P over the distance (known) between the sheet sensor 22 and the reading sensor 231. Thus the ejection control portion 110*d* can recognize, out of the plurality of regions of openings 80 included in the opening reading data, the region 80R of openings 80 located at positions deviated in the conveying direction from the sheet P sensed by the sheet sensor 22. For example, when the sheet sensor 22 successively senses a third and then a fourth sheet after the first, the ejection control portion 110*d* can, with the above-mentioned timing, read the opening reading data from the data storage portion 110*c* to recognize the region 80R of the openings 80 that are located between the third and fourth sheets P on the first conveying belt 8.

The ejection control portion 110*d* may instead recognize a sheet-to-sheet interval (the region between consecutive sheets P) based on the sheet reading data stored in the data storage portion 110*c* and recognize, in the opening reading data, the region 80R of the openings 80 located so as to correspond to the sheet-to-sheet interval.

<Reading Default Data>

In the data storage portion 110*c* in the control device 110, default data is stored beforehand ready for use. The default data is ejection-on driving data according to which ink is ejected from all the ink ejection apertures 18 in the recording heads 17*a* to 17*c*, and has, for example, such a data length as to correspond to one turn of the first conveying belt 8. The ejection control portion 110*d* reads such default data for flushing from the data storage portion 110*c*.

<Generating Flushing Data>

The ejection control portion 110*d* generates flushing data that suits (i.e., matches the position and the shape of) the region 80R of the openings 80 that it has recognized. More specifically, the ejection control portion 110*d* masks the default data for flushing that it has read from the data storage portion 110*c* with the opening reading data that it has likewise read from the data storage portion 110*c*. Of the default data, the part that overlaps the region 80R in the opening reading data is taken as flushing data. This flushing data is stored, for example, in the data storage portion 110*c*.

(5-4. Ejecting Ink)

The ejection control portion 110*d* recognizes the period (image formation period Tm) during which the vertical synchronizing signal from the sheet sensor 22, when delayed by the above-mentioned conveyance time, stays at high level and the period (non-image formation period Tf) during which the same signal so delayed stays at low level, and drives the recording heads 17*a* to 17*c* to eject ink in each of those recognized period. Specifically, during the image formation period Tm, the ejection control portion 110*d* recognize the region where sheet P is located on the first conveying belt 8 based on the sheet reading data, and with respect to that region drives the recording heads 17*a* to 17*c* based on image data (e.g., transmitted from the outside) to make them eject ink. Thus an image is formed on the sheet P on the first conveying belt 8. In FIG. 8, regions where images are formed by ink ejection are identified as image formation regions MR.

On the other hand, during the non-image formation period Tf, the ejection control portion 110*d* drives the recording heads 17*a* to 17*c* based on the above-mentioned flushing data to make them perform flushing. In the flushing, the ink ejected from the ink ejection apertures 18 in the recording heads 17*a* to 17*c* passes through some of those of the openings 80 in the first conveying belt 8 which are located at positions deviated form the sheet P in the conveying direction. In FIG. 8, the regions of the openings 80 through which ink passes are identified as flushing regions FR. The ink that has passed through the openings 80 is collected in the ink receiving portions 31Y to 31K (see FIG. 3) and is then delivered to the waste ink tank.

The ejection control portion 110*d* may recognize the image formation period Tm and the non-image formation period Tf based on sheet reading data. Specifically, it may recognize a period in which a sheet P (white region) is present as the image formation period Tm and recognize a period in which no sheet P is present as the non-image formation period Tf. The ejection control portion 110*d* can then, by performing ink ejection control similar to that described above, make the recording heads 17*a* to 17*c* perform flushing or image formation.

The delay time after the reading sensor 231 reads the sheet P or the openings 80 at the reading position until the recording heads 17*a* to 17*c* are made to eject ink to the sheet P or the openings 80 thus read is set to be TL (sec). How this TL is set will be described in connection with the ink ejection timing adjustment method described later.

[6. Effects of the Above Construction of an Inkjet Recording Apparatus]

As described above, in the embodiment, the ejection control portion 110*d* controls ink ejection in the recording heads 17*a* to 17*c* based on at least one of opening reading data (information on the openings 80) or sheet reading data (information on the sheet P) read by the reading sensor 231. It is thus possible to perform flushing in which ink is ejected from the recording heads 17*a* to 17*c* toward the openings 80, and it is also possible to form an image on the sheet P by ejecting ink from the recording heads 17*a* to 17*c* toward the sheet P.

The reading mode switching control portion 110*b* switches the reading mode of the reading sensor 231 between the first and second reading modes (see FIG. 7). It is thus possible to read information on the openings 80 and information on the sheet P alternately using the same reading sensor 231 to acquire opening reading data and sheet reading data. That is, with a construction that uses a single reading sensor 231 as a sensor for reading information, it is possible to acquire both opening reading data and sheet reading data. It is thus possible to achieve cost reduction in the printer 100 compared with a construction that uses separate sensors to acquire opening reading data and sheet reading data.

The reading mode switching control portion 110b switches between the first and second reading modes alternately every integral multiple of the formation period for one dot as the unit of the resolution of the image. In this case, the reading sensor 231 can acquire opening reading data and sheet reading data at a resolution, despite being lower than that of the image, sufficient to recognize the openings 80 and the sheet P.

In particular, as in the embodiment, the reading mode switching control portion 110b can switch between the first and second reading modes alternately every formation period (the above-mentioned integral multiple being one) for one dot. In this case, it is possible to acquire, despite at a resolution lower than that of the image, opening reading data and sheet reading data with as high definition as possible.

The reading sensor 231 acquires information on the openings 80 by receiving the light emitted from the first light source 232 and transmitted through openings 80 in the first conveying belt 8, and acquires information on the sheet P by receiving the light emitted from the second light source 233 and reflected from the sheet P. Thus, with a construction that uses two light sources (first and second light sources 232 and 233) for a single sensor (reading sensor 231), it is possible to acquire information on the openings 80 and information on the sheet P. The second light source 233 and the reading sensor 231 are disposed at positions on the same side of the sheet P, and thus it is possible to configure the second light source 233 and the reading sensor 231 as a consolidated unit (the reading unit 23a in FIG. 6). It is thus possible, with a simple construction that includes the first light source 232 in addition to the consolidated unit, to acquire information on the openings 80 and information on the sheet P.

The light source control portion 110e switches the lighting of the first and second light sources 232 and 233 in accordance with the reading mode of the reading sensor 231. Thus, with a construction that uses a single reading sensor 231, it is possible to read information on the openings 80 based on reception of transmitted light from the first light source 232 and to read information on the sheet P based on reception of reflected light from the second light source 233.

In particular, the light source control portion 110e lights the first light source 232 when the reading sensor 231 is in the first reading mode, and lights second light source 233 when the reading sensor 231 is in the second reading mode. In the first reading mode, the first light source 232 is lit, and thus the reading sensor 231 can, by receiving the light emitted from the first light source 232 and transmitted through the openings 80, read information on the openings 80. On the other hand, in the second reading mode, the second light source 233 is lit, and thus the reading sensor 231 can, by receiving the light emitted from the second light source 233 and reflected from the sheet P, read information on the sheet P.

The ejection control portion 110d generates, based on the information on the openings 80 read by the reading sensor 231 in the first reading mode, flushing data to be passed through the openings 80 and, based on the generated data, makes the recording heads 17a to 17c perform flushing. In this way, it is possible to properly perform what is called sheet-interval flushing, that is, flushing in which ink is ejected toward those openings 80 in the first conveying belt 8 where no sheet P is placed.

The ejection control portion 110d may reduce the flushing data for each opening 80 and make the recording heads 17a to 17c perform flushing using the reduced data. In that case, in flushing, ink passes well inside the openings 80, and it is thus possible to reduce what is called belt soiling, that is, the phenomenon of ink being deposited around the openings 80.

The ejection control portion 110d makes the recording heads 17a to 17c eject ink for image formation based on the information on the sheet P read by the reading sensor 231 in the second reading mode. It is thus possible to make ink for image formation land properly on the sheet P placed on the first conveying belt 8 to form an image on the sheet P.

The information on the openings 80 read by the reading sensor 231 includes information on at least one of the shape, size, and position of the openings 80 in the first conveying belt 8. Thus, based on information on the shape or the like of the openings 80, the ejection control portion 110d can properly generate flushing data such that ink is ejected so as to pass through the openings 80 and make the recording heads 7a to 17c perform flushing properly.

The information on the sheet P read by the reading sensor 231 includes information on at least one of the size and position of the sheet P. Thus, irrespective of the size of the sheet P used, or irrespective of the position at which the sheet P is placed on the first conveying belt 8, the ejection control portion 110d can control ink ejection from the recording heads 17a to 17c based on the read information on the sheet P and properly form an image on the sheet P.

[7. Modified Reading Control]

Figure 9:
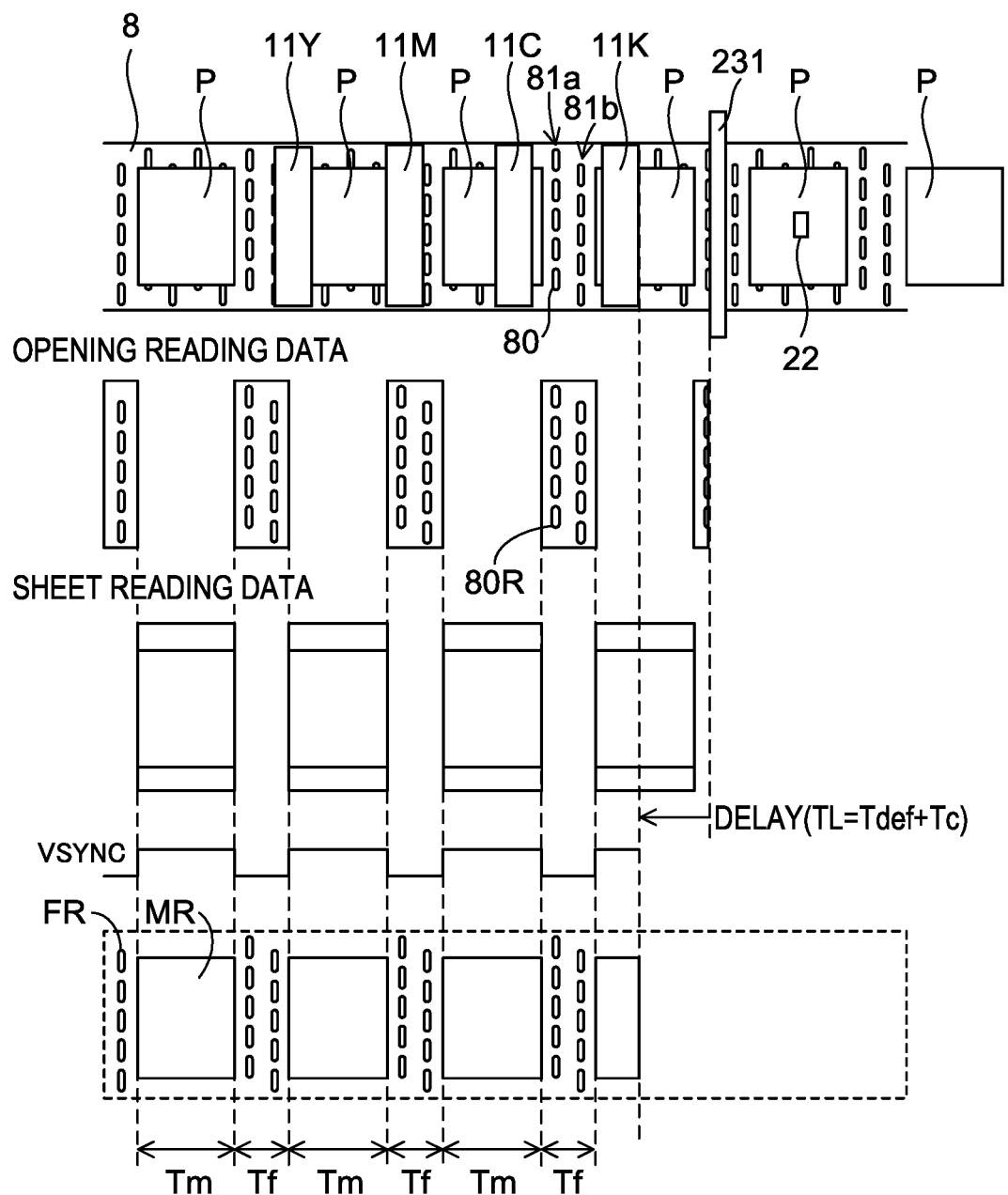
FIG. 9 is an illustrative diagram schematically showing another example of the opening reading data and the sheet reading data acquired by the reading sensor.

FIG. 9 schematically shows another example of the opening reading data and the sheet reading data acquired by the reading sensor 231. The reading mode switching control portion 110b may switch between the first and second reading modes alternately based on the result of the sensing of a sheet P by the sheet sensor 22. In this case, information on the sheet P and information on the openings 80 can each be acquired with no drop in resolution (e.g., at a resolution of 600 dpi). This will now be discussed in more detail.

The sheet P is conveyed at a constant speed; thus, by delaying the vertical synchronizing signal (VSYNC) from the sheet sensor 22 by the time taken to convey the sheet P over the distance between the sheet sensor 22 and the reading sensor 231, the reading mode switching control portion 110b can, based on the so delayed vertical synchronizing signal, determine whether or not the sheet P is passing across the position (reading position) just under the reading sensor 231. That is, based on the result of sensing of the sheet P by the sheet sensor 22, the reading mode switching control portion 110b can determine the timing with which and the period during which (as the first conveying belt 8 turns) the sheet P passes across the position at which it is read by the reading sensor 231.

During the period in which the sheet P passes across the above-mentioned reading position (i.e., the period in which VSYNC is at high level), the reading mode switching control portion 110b keeps the reading sensor 231 in the second reading mode; during the period other than the just-mentioned period (i.e., the period in which VSYNC is at low level), the reading mode switching control portion 110b keeps the reading sensor 231 in the first reading mode. The period in which VSYNC is at high level and the period in which VSYNC is at low level are switched alternately in accordance with whether the sheet sensor 22 is sensing or not sensing the presence of the sheet P, and thus the first and second reading modes are switched alternately in such a manner as to correspond to those periods respectively (see FIG. 9).

As a result of, as described above, the reading mode switching control portion 110b switching between the first and second reading modes alternately based on the result of the sensing of the sheet P by the sheet sensor 22, during the period in which the sheet P passes across the reading position just under the reading sensor 231, the reading mode can be fixed to the second reading mode so that the reading sensor 231 operates in the second reading mode throughout the period. In this way, during the period in which the sheet P passes across the reading position, the reading sensor 231 can all the time read information on the sheet P, and can acquire information on the sheet P with no drop in resolution (e.g., at a resolution of 600 dpi).

On the other hand, during the period other than the period in which the sheet P passes across the reading position just under the reading sensor 231, the reading mode can be fixed to the first reading mode so that the reading sensor 231 operates in the first reading mode throughout the period. In this way, during the period other than the period in which the sheet P passes across the reading position, the reading sensor 231 can all the time read information on the openings 80, and can acquire information on the openings 80 with no drop in resolution (e.g., at a resolution of 600 dpi).

As described above, based on the result of the sensing of the sheet P by the sheet sensor 22, during the period in which the sheet P passes across the position where it is read by the reading sensor 231, the reading mode switching control portion 110b sets the reading mode of the reading sensor 231 to the second reading mode; on the other hand, during the period other than the just-mentioned period, the reading mode switching control portion 110b sets the reading mode of the reading sensor 231 to the first reading mode. It is thus possible to acquire information (information on the sheet P and information on the openings 80) at a high resolution in both of those periods. Thus the ejection control portion 110d can based on information acquired at a high resolution control ink ejection by the recording heads 17a to 17c to properly perform image formation on the sheet P as well as sheet-interval flushing.

[8. Modified Construction of the Information Reading Portion]

Figure 10:
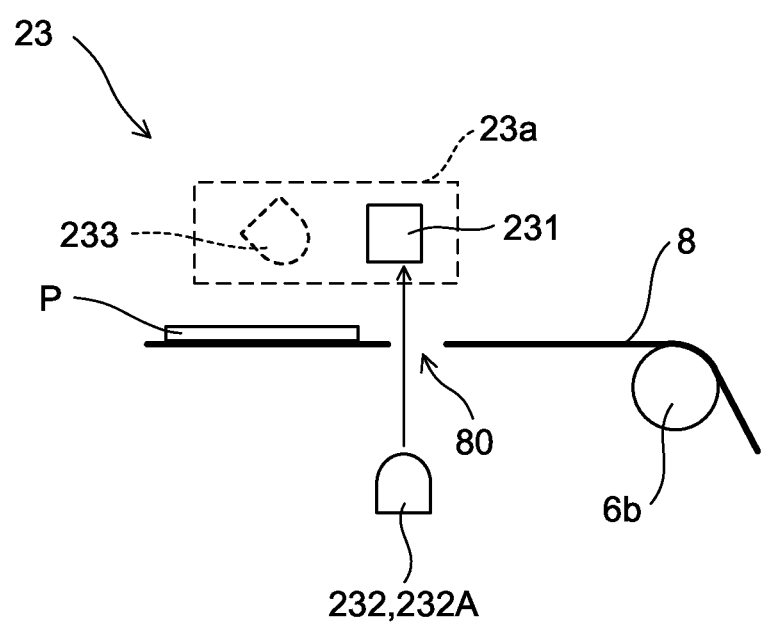
FIG. 10 is an illustrative diagram schematically showing another example of the construction of the information reading portion.

FIG. 10 is an illustrative diagram schematically showing another example of the construction of the information reading portion 23 in the embodiment. The information reading portion 23 may include a reading sensor 231 and a dedicated light source 232A. The reading sensor 231 and the dedicated light source 232A are quite the same as the reading sensor 231 and the first light source 232 in FIG. 6. The reading sensor 231 is housed in the reading unit 23a. The reading unit 23a also houses the second light source 233, which is here not used.

The reading sensor 231 is located on the side of the first conveying belt 8 opposite from the dedicated light source 232A. Based on the amount of light received out of the light emitted from the dedicated light source 232A, the reading sensor 231 acquires information on the sheet P and information on the openings 80. In this case, with a simple construction using one light source (dedicated light source 232A) and one sensor (reading sensor 231), it is possible to acquire information on the sheet P and information on the openings 80.

Figure 11:
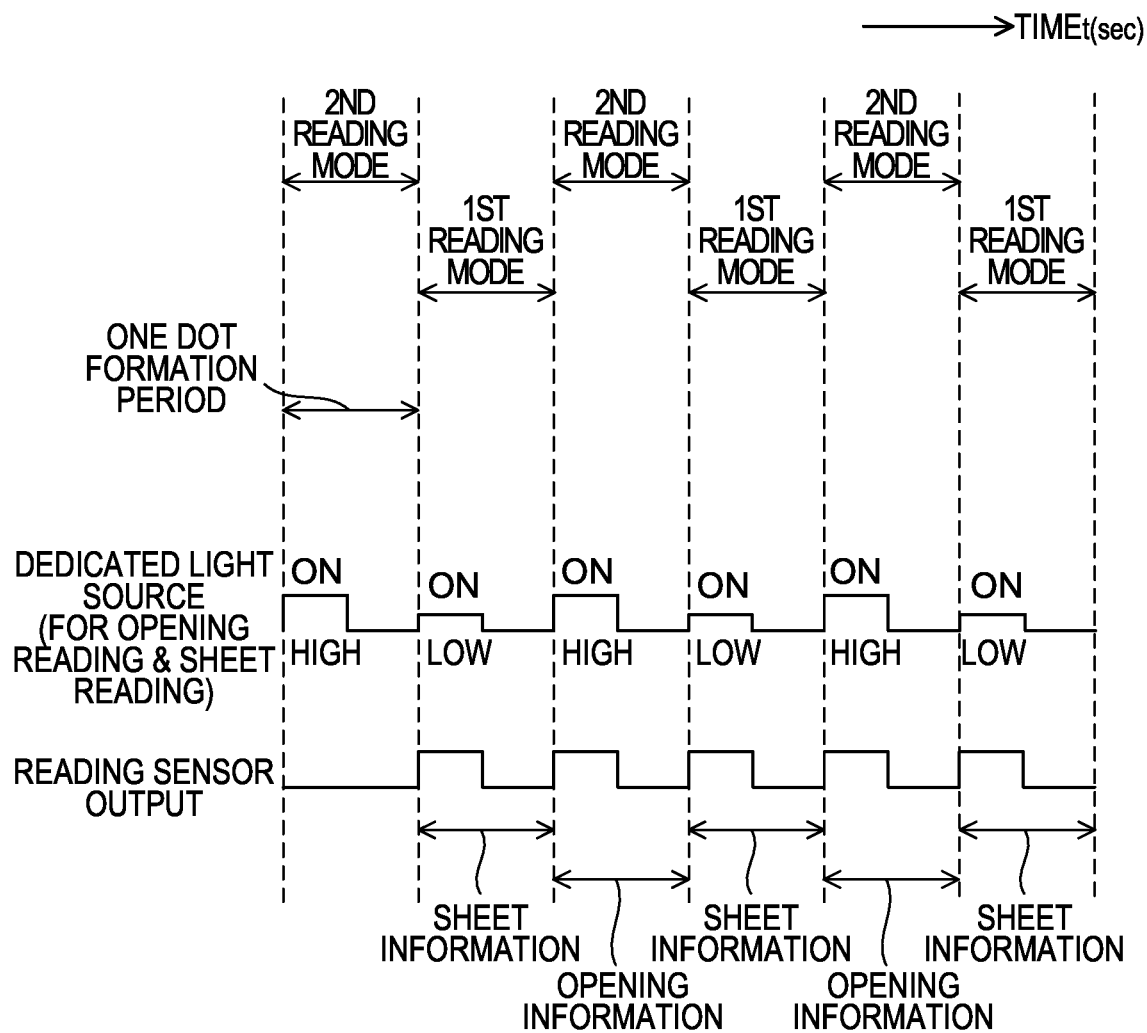
FIG. 11 is an illustrative diagram showing one example of the timing of lighting of and the amount of light emitted from a dedicated light source in the information reading portion in FIG. 10.

The lighting of the dedicated light source 232A is controlled by the light source control portion 110e. Based on the reading mode of the reading sensor 231, the light source control portion 110e switches the amount of light emitted from the dedicated light source 232A. FIG. 11 is an illustrative diagram showing one example of the timing of the lighting of and the amount of light emitted from the dedicated light source 232A. As shown there, when the reading sensor 231 is in the first reading mode, the light source control portion 110e makes the just-mentioned amount of light relatively small (make the intensity of light relatively low); when the reading sensor 231 is in the second reading mode, the light source control portion 110e makes the just-mentioned amount of light relatively large (make the intensity of light relatively high). As in the case shown in FIG. 7, the reading sensor 231 is configured to output in the subsequent reading mode (period) the information acquired in the preceding reading mode.

The first conveying belt 8 is formed of thin polyimide-based film, and this makes it possible to change, in accordance with the amount of light emitted from the dedicated light source 232A, the amount (transmitted amount) of light transmitted through the first conveying belt 8. Accordingly, the light source control portion 110e, when the dedicated light source 232A is used as a light source for sheet sensing, increases the intensity of the light from it and, when the dedicated light source 232A is used as a light source for sensing openings, decreases the intensity of the light from it, the light source control portion 110e switching between the different light intensities alternately every period. Through such switching of the light intensity, the output of the reading sensor 231 in different light source conditions can be acquired as information on the sheet P and information on the openings 80 respectively.

Figure 12:
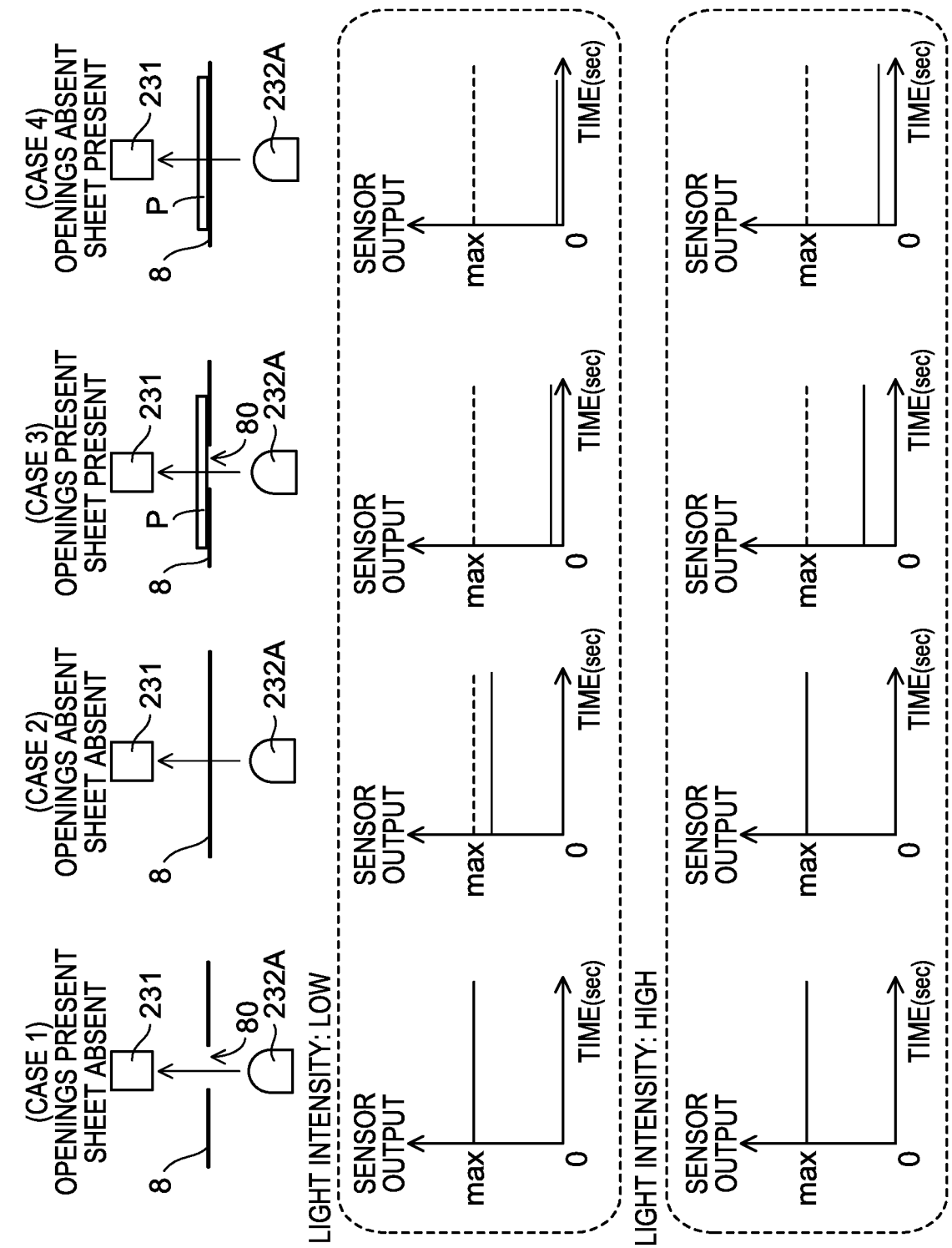
FIG. 12 is an illustrative diagram schematically showing, separately for different cases, the relationship of the amount of light emitted from the dedicated light source with the output of the reading sensor.

FIG. 12 schematically shows the relationship between the amount of light (the intensity of the light) emitted from the dedicated light source 232A and the output of the reading sensor 231 in various cases. The relationship between the light intensity and the sensor output in each case will now be described.

(Case 1)

Case 1 is a situation where the openings 80 in the first conveying belt 8 are located between the dedicated light source 232A and the reading sensor 231 and in addition no sheet P is located there. In Case 1, irrespective of whether the light intensity is "low" or "high", the light emitted from the dedicated light source 232A reaches the reading sensor 231 without being either intercepted or absorbed. Accordingly, irrespective of whether the light intensity is "low" or "high", the sensor output from the reading sensor 231 is maximal (max).

(Case 2)

Case 2 is a situation where no openings 80 in the first conveying belt 8 are located between the dedicated light source 232A and the reading sensor 231 and in addition no sheet P is located there. In Case 2, of the light emitted from the dedicated light source 232A, part is intercepted or absorbed by the first conveying belt 8, and the rest is transmitted through the first conveying belt 8 to reach the reading sensor 231.

When the light intensity is "low", a small amount of light is transmitted through the first conveying belt 8, and thus the reading sensor 231 receives a small amount of light. Accordingly, the sensor output from the reading sensor 231 is lower than the maximum value. On the other hand, when the light intensity is "high", even if part of the light emitted from the dedicated light source 232A is intercepted or absorbed by the first conveying belt 8, a large amount of light is transmitted through the first conveying belt 8, and thus the reading sensor 231 receives a large amount of light. Accordingly, the output from the reading sensor 231 is maximal.

(Case 3)

Case 3 is a situation where the openings 80 in the first conveying belt 8 are located between the dedicated light source 232A and the reading sensor 231 and in addition a sheet P is located there. In Case 3, of the light emitted from the dedicated light source 232A, part is intercepted or absorbed by the sheet P, and the rest is transmitted through the sheet P to reach the reading sensor 231. When the light intensity is "low", as a result of the interception or absorption of light by the sheet P, the reading sensor 231 receives an even smaller amount of light than in Case 2. Accordingly, the sensor output from the reading sensor 231 is even lower than in Case 2. When the light intensity is "high", compared with when the light intensity is "low", of the light emitted from the dedicated light source 232A, a larger amount is transmitted through the sheet P, and thus the reading sensor 231 receives a larger amount of light. Accordingly, the output from the reading sensor 231, despite being lower than the maximum value, is higher than when the light intensity is "low".

(Case 4)

Case 4 is a situation where no openings 80 in the first conveying belt 8 are located between the dedicated light source 232A and the reading sensor 231 and in addition a sheet P is located there. In Case 4, of the light emitted from the dedicated light source 232A, part is intercepted or absorbed by the first conveying belt 8 and the sheet P, and the rest is transmitted through the first conveying belt 8 and the sheet P to reach the reading sensor 231. Irrespective of whether the light intensity is "low" or "high", the interception or absorption of light by the first conveying belt 8 and the sheet P has so large an effect that the reading sensor 231 receives a still smaller amount of light than in Case 3. Accordingly, irrespective of whether the light intensity is "low" or "high", the sensor output from the reading sensor 231 is still lower than in Case 3.

Figure 13:
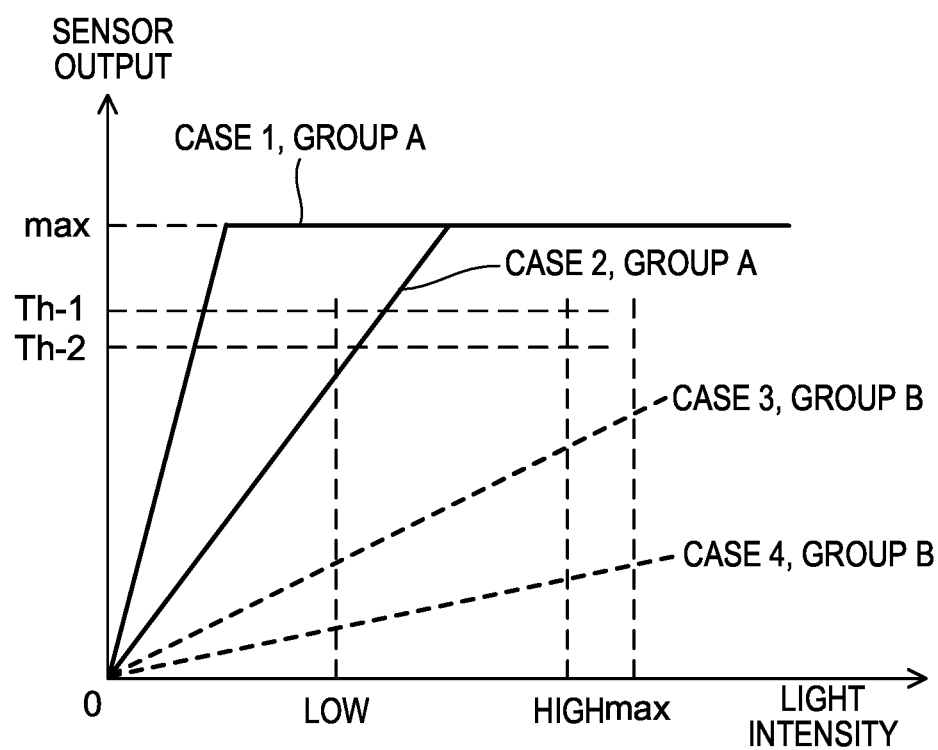
FIG. 13 is a graph showing, in a consolidated fashion, the relationship between the light intensity and the sensor output in the different cases.

FIG. 13 is a graph showing, in a consolidated fashion, the relationship between the light intensity and the sensor output in Cases 1 to 4 described above. As shown in FIG. 13, the sensor output is proportional to the light intensity up to the maximum value. Based on this it is possible to distinguish, for example, whether or not any openings 80 where no sheet P is placed are located between the dedicated light source 232A and the reading sensor 231. To that end, distinguishing Case 1 from the other cases, that is, Cases 2 to 4, suffices. From FIG. 13 it is seen that, by setting a threshold value Th-1 between the sensor output (theoretical value) in Case 1 and the sensor output (theoretical value) in Case 2 under the condition that the light intensity is "low", it is possible to distinguish Case 1 from the other cases based on the magnitude relationship between the sensor output (actual value) observed when the light intensity is "low" and the threshold value Th-1. That is, it is possible to distinguish whether or not any openings 80 where no sheet P is placed are located between the dedicated light source 232A and the reading sensor 231.

For example, when the light intensity of the dedicated light source 232A is set "low", if the output (actual value) of the reading sensor 231 is equal to or higher than the threshold value Th-1, this corresponds to Case 1, meaning that some openings 80 where no sheet P is placed are located between the dedicated light source 232A and the reading sensor 231. On the other hand, when the light intensity of the dedicated light source 232A is set "low", if the output (actual value) of the reading sensor 231 is lower than the threshold value Th-1, this corresponds to one of Cases 2 to 4, meaning either that no openings 80 are located between the dedicated light source 232A and the reading sensor 231 (Case 2) or that a sheet P is placed there (Cases 3 and 4).

Thus, under the condition that the light intensity of the dedicated light source 232A is "low", the output of the reading sensor 231, when it is equal to or higher than the threshold value Th-1, conveys the information that the openings 80 are located at the reading position just under the reading sensor 231.

To distinguish whether or not, for example, a sheet P is located between the dedicated light source 232A and the reading sensor 231, distinguishing Group A, to which Cases 1 and 2 belong, from Group B, to which Cases 3 and 4 belong, suffices. From FIG. 13 it is seen that, by setting a threshold value Th-2 between the sensor output (theoretical value) in Group A and the sensor output (theoretical value) in Group B (e.g., in Case 3 as a representative) under the condition that the light intensity is "high", it is possible to distinguish between Groups A and B based on the magnitude relationship between the sensor output (actual value) observed when the light intensity is "high" and the threshold value Th-2. That is, it is possible to distinguish whether or not a sheet P is located between the dedicated light source 232A and the reading sensor 231.

For example, when the light intensity of the dedicated light source 232A is set "high", if the output (actual value) of the reading sensor 231 is equal to or higher than the threshold value Th-2, this corresponds to Group A, meaning that no sheet P is located between the dedicated light source 232A and the reading sensor 231. On the other hand, when the light intensity of the dedicated light source 232A is set "high", if the output (actual value) of the reading sensor 231 is lower than the threshold value Th-2, this corresponds to Group B, meaning that a sheet P is located between the dedicated light source 232A and the reading sensor 231.

Thus, under the condition that the light intensity of the dedicated light source 232A is "high", the output of the reading sensor 231, when it is lower than the threshold value Th-2, conveys the information that a sheet P is located at the reading position just under the reading sensor 231.

As described above, the sensor output that reflects the amount of light received by the reading sensor 231 is associated with information indicating whether or not a sheet P is located at the reading position just under the reading sensor 231 or information indicating whether or not openings 80 are located at that reading position. Accordingly, as the light source control portion 110*e* switches the amount of light (the intensity of the light) emitted from the dedicated light source 232A in accordance with the reading mode of the reading sensor 231, in the first reading mode, an amount of light according to the first reading mode (e.g., "low" intensity light) is emitted from the dedicated light source 232A, so that the reading sensor 231 can acquire information on the openings 80; in the second reading mode, an amount of light according to the second reading mode (e.g., "high" intensity light) is emitted from the dedicated light source 232A, so that the reading sensor 231 can acquire information on the sheet P. That is, even with a construction where the information reading portion 23 uses a single dedicated light source 232A, the reading sensor 231 can acquire both information on the sheet P and information on the openings 80.

In particular, the light source control portion 110*e*, when the reading sensor 231 is in the first reading mode, makes the amount of light emitted from the dedicated light source 232A relatively small (makes the intensity of the light low) and, when the reading sensor 231 is in the second reading mode, makes the just-mentioned amount of light relatively large (makes the intensity of the light high). In the first reading mode, since the amount of light emitted from the dedicated light source 232A is relatively small, the reading sensor 231 can, based on the amount of light received out of the light emitted from the dedicated light source 232A, determine whether or not the received light is light transmitted through the openings 80 and acquire information on the openings 80. In the second reading mode, since the amount of light emitted from the dedicated light source 232A is relatively large, the reading sensor 231 can, based on the amount of light received out of the light emitted from the dedicated light source 232A, determine whether or not the received light is light transmitted through the sheet P and acquire information on the sheet P.

[9. Method of Adjusting Ink Ejection Timing]

As described above, the printer 100 according to the embodiment includes the reading sensor 231. The reading sensor 231, in the first reading mode, reads the openings 80 formed in the first conveying belt 8 to acquire information on the openings 80 (hereinafter referred to also as "opening information") and, in the second reading mode, reads the sheet P fed onto the first conveying belt 8 to acquire information on the sheet P (hereinafter referred to also as "recording medium information"). The reading sensor 231 allows for fitting tolerance, due to which the appropriate timing with which to pass ink through the openings 80 in the actual use of the printer 100 (e.g., during flushing) varies from one printer 100 to another.

To cope with that, a description will now be given of a method of adjusting the timing of ink ejection that is applicable to a printer 100 that includes a single reading sensor 231 as a sensor for reading opening information and recording medium information. An adjustment method according to the embodiment is practiced, for example, at (more precisely, before) the shipment of the printer 100 from the factory, but may also be practiced on the occasion of part replacement or maintenance after the printer 100 is shipped from the factory and put on the market.

Figure 14:
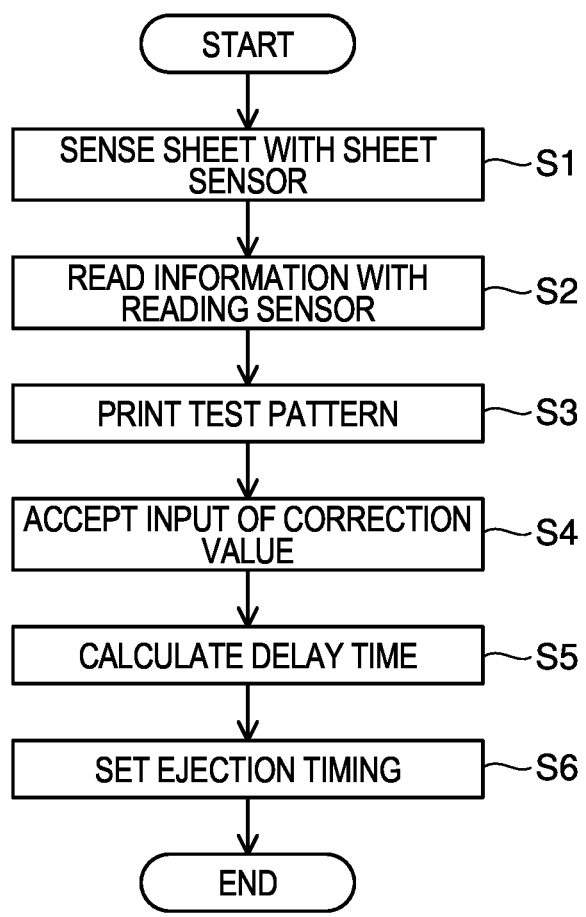
FIG. 14 is a flow chart showing a procedure of operation in line with an ink ejection timing adjustment method applicable to the printer.

FIG. 14 is a flow chart showing a procedure of operation in line with an ink ejection timing adjustment method according to an embodiment. The adjustment method includes a sheet sensing step (S1), an information acquiring step (S2), a test pattern printing step (S3), a correction value input accepting step (S4), a delay time calculating step (S5), and an ejection timing setting step (S6). These steps will be described one by one below.

(S1: Sheet Sensing Step)

As a sheet P is conveyed from the pair of registration rollers 13 toward the first conveying belt 8, the sheet sensor 22 senses the sheet P fed onto the first conveying belt 8 (S1). The sheet sensor 22 outputs a sense signal (vertical synchronizing signal VSYNC) with respect to the sheet P.

(S2: Information Acquiring Step)

The sheet P fed onto the first conveying belt 8 reaches the reading position just under the reading sensor 231. At the reading position the reading sensor 231 reads, as opening information, information on the position and the like of the openings 80 formed in the first conveying belt 8, and reads, as recording medium, information on the position and the like of the sheet P.

Here the reading mode switching control portion 110b switches between the first and second reading modes alternately, for example, every formation period for one dot. As a result, in a case where, as the reading sensor 231, a sensor capable of monochrome reading at a resolution of 600 dpi is used, the reading sensor 231 acquires the opening information at a resolution of 300 dpi and acquires the recording medium information at a resolution of 300 dpi. The cycle at which the first and second reading modes are switched alternately is not limited to the formation period for one dot as mentioned above, but may instead be two or more times the formation period for one dot.

Figure 15:
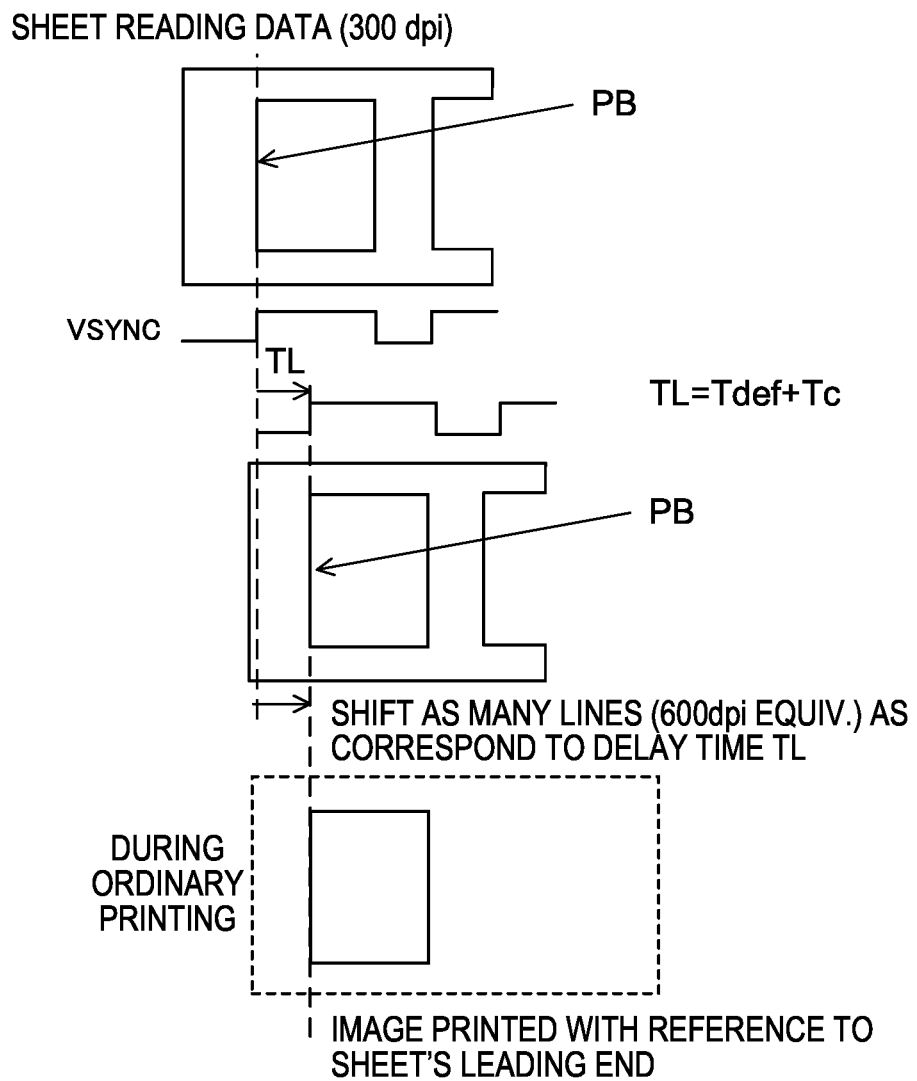
FIG. 15 is an illustrative diagram showing recording medium information acquired in an information acquiring step included in the adjustment method.
Figure 16:
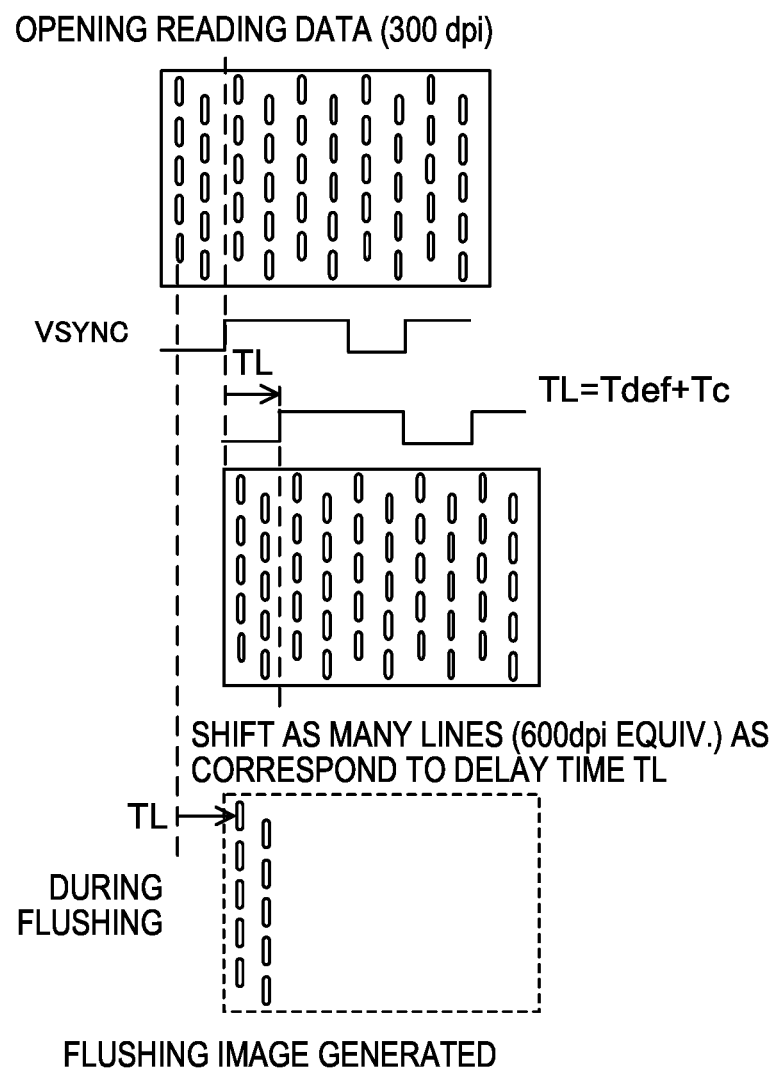
FIG. 16 is an illustrative diagram showing opening information acquired in the information acquiring step.

FIGS. 15 and 16 show the recording medium information (sheet reading data) and the opening information (opening reading data), respectively, that are acquired in the information acquiring step S2. As shown in FIG. 15, acquired as the recording medium information is white/black binary data (300 dpi) in which the region of the sheet P is white and the region other than that is black. As shown in FIG. 16, acquired as the opening information is white/black binary data (300 dpi) in which the regions of the openings 80 are white and the region other than that is black. In the information acquiring step, of the opening information and the recording medium information, only the recording medium information may be acquired by the reading sensor 231, and such an example will be described later.

In the information acquiring step, in accordance with the reading mode of the reading sensor 231, the light source control portion 110e switches the lighting of the first and second light sources 232 and 233 (see FIG. 6). Here the switching of the lighting of the first and second light sources 232 and 233 can be performed with similar timing as in FIG. 7. Specifically, in the first reading mode the first light source 232 is lit (the second light source 233 is extinguished), and in the second reading mode the second light source 233 is lit (the first light source 232 is extinguished). Accordingly, in the first reading mode the reading sensor 231 can, by receiving the light emitted from the first light source 232 and transmitted through the openings 80, acquire the opening information mentioned above, and in the second reading mode the reading sensor 231 can, by receiving the light emitted from the second light source 233 and reflected from the sheet P, acquire the recording medium information mentioned above. In each reading mode, from the viewpoint of preventing erroneous sensing, the lit period of the first or second light source 232 or 233 is about one half of the entire period of the reading mode.

(S3: Test Pattern Printing Step)

Next, based on the recording medium information acquired in S2, the main control portion 110a senses the leading end of the sheet P. Of the recording medium information shown in FIG. 15, as described above, the part shown to be white corresponds to the region of the sheet P and the part shown to be black (hatched region) corresponds to the region other than the sheet P. Accordingly the main control portion 110a can sense as the position of the leading end of the sheet P the part PB at which the image data changes from black to white as seen from downstream in the sheet conveyance direction.

Next, after, as a result of the first conveying belt 8 turning, the leading end of the sheet P sensed as described above passes the reading position of the reading sensor 231, when a default set time Tdef (sec) that is previously set as the time taken to convey the sheet P between the reading sensor 231 and the recording heads 17a to 17c elapses, the ejection control portion 110d makes the recording heads 17a to 17c eject ink. Thus a test pattern is printed on the sheet P on the first conveying belt 8.

Here, whereas the fitting position of the reading sensor 231 allows for tolerance, the distance between the reading sensor 231 and the recording heads 17a to 17c is previously set at a design value. The conveyance speed of the sheet P is previously determined. Thus the theoretical time (default set time Tdef) required to convey the sheet P between the reading sensor 231 and the recording heads 17a to 17c can be calculated by dividing the just-mentioned distance by the just-mentioned conveyance speed. The test pattern mentioned above can be any pattern, and can here be thought to be a pattern comprising lines formed along the sheet width direction by ink ejection.

(S4: Correction Value Input Accepting Step)

Once the test pattern is printed on the sheet P, based on the printed position of the test pattern, a worker for instance can determine how far the position where it is formed is displaced from where it should be formed. For example, in a case where the ink ejection timing is by default so set that the test pattern is formed at a position 20 mm upstream of the leading end of the sheet P, suppose that, due to the fitting tolerance of the reading sensor 231, the position of the test pattern actually printed in S3 is 22 mm upstream of the leading end of the sheet P. In this case, unless the ink ejection timing for flushing is shifted (in the just-mentioned example, delayed) by the time Tc (sec) corresponding to the displacement (2 mm) between the theoretical and actual position of the test pattern, during flushing in actual use of the printer 100, the ejected ink passes at a position displaced 2 mm upstream of the openings 80. Thus the ink diverges off the openings 80 and lands on the belt part around them, soiling the first conveying belt 8.

To avoid that, in such a case, based on the printed position of the test pattern, a worker at the factory enters on the operation panel 27 a correction value (e.g., "+2") corresponding to a correction time (the time equivalent to the +2 mm above). That is, the operation panel 27 accepts input of the correction value by the worker. Such input of a correction value makes it possible to correct the ink ejection timing for forming 600 dpi dots by using 300 dpi data (despite at a correction accuracy of 300 dpi) as the sheet reading data (recording medium information).

(S5: Delay Time Calculating Step)

With the correction value entered in S4, the main control portion 110a adds to the default set time Tdef the correction time (in the example above, the time Tc corresponding to a conveyance distance of +2 mm) equivalent to the correction value, and thereby calculates a delay time TL (sec) as a time for which to delay the ink ejection timing from the reading position of the reading sensor 231. Thus TL=Tdef+Tc.

(S6: Ejection Timing Setting Step)

In S6, the main control portion 110a takes the delay time TL calculated at S5 as the predetermined time at the lapse of which after, as a result of the first conveying belt 8 turning, the openings 80 pass the reading position the recording heads 17a to 17c start to eject ink to the openings 80. Thus, in actual flushing and in actual image formation, the ejection timing of ink from the recording heads 17a to 17c is shifted by the number of lines (600 dpi equivalent) corresponding to the delay time TL as compared with before the delay time TL is set (see FIGS. 15 and 16).

[10. Effects of the Adjustment Method Described Above]

As described above, in an ink ejection timing adjustment method according to the embodiment, in the delay time calculating step (S5), the correction time (time Tc) is added to the default set time Tdef to calculate the delay time TL. Then, in the ink ejection timing setting step (S6), the delay time TL is taken as the predetermined time at the lapse of which after, during actual flushing, the leading end of the sheet P passes the reading position the ejection of ink (flushing) to the openings 80 is started. Thus, even though the reading sensor 231 allows for fitting tolerance, in actual use of the printer 100, the recording heads 17a to 17c can be made to eject ink with appropriate timing with consideration given to the correction value for such fitting tolerance (i.e., at the lapse of the delay time TL from the reading position) to let the ink pass through the openings 80. It is thus possible to reduce, during flushing, the likelihood of ink, due to the fitting tolerance of the reading sensor 231, landing around the openings 80 and soiling the first conveying belt 8.

In particular, in the embodiment, the sensor that acquires opening information and the sensor that acquires recording medium information are implemented as a common (the same) reading sensor 231. Thus the correction value for the ink ejection timing obtained from the result (test pattern) of printing performed with reference to the leading end of the sheet P detected based on the recording medium information, that is, the correction value with consideration given to displacement (fitting tolerance) of the reading sensor 231 with respect to the recording heads 17a to 17c, can be applied not only to correct the shift of the ink ejection timing during image formation but also to correct the shift of the ink ejection timing during flushing. It can thus be said that an ink ejection timing adjustment method according to the embodiment can be implemented suitably just in a construction where opening information and recording medium information are acquired by the same reading sensor 231.

In the information acquiring step S2, the reading mode of the reading sensor 231 is switched alternately between the first and second reading modes. In this way, in the printer 100 that uses a single reading sensor 231, when the ink ejection timing is adjusted, opening information and recording medium information can be acquired. Acquiring recording medium information makes it possible, in the test pattern printing step S3, to print a test pattern on the sheet P while recognizing the region of the sheet P on the first conveying belt 8 based on the recording medium information. Acquiring opening information makes it possible, for example after the ink ejection timing is set in S6, to make the recording heads 17a to 17c eject ink actually to the regions of the openings 80 recognized based on the opening information to check whether or not the ink has passed through the openings 80 (whether or not the first conveying belt 8 is soiled around the openings 80).

In the information acquiring step S2, the first and second reading modes are switched alternately every integral multiple of the formation period for one dot as the unit of the resolution of the image formed on the sheet P. In this way the reading sensor 231 can, during ink ejection timing adjustment, acquire opening information and recording medium information at a resolution, despite being lower than that of the image formed on the sheet P, sufficient to recognize the openings 80 and the sheet P.

In particular, in the information acquiring step S2, the first and second reading modes are switched alternately every formation period for one dot. In this way the reading sensor 231 can, during ink ejection timing adjustment, acquire opening information and recording medium information, despite at a resolution lower than that of the image formed on the sheet P, with as high definition as possible (so as not to be too coarse). It is thus possible, based on the recording medium information in particular, to sense the position of the leading end of the sheet P accurately.

In the information acquiring step S2, the light source control portion 110e switches the lighting of the first and second light sources 232 and 233 in accordance with the reading mode of the reading sensor 231. The reading sensor 231, in the first reading mode, receives the light emitted from the first light source 232 and transmitted through the openings 80 to acquire the opening information mentioned above and, in the second reading mode, receives the light emitted from the second light source 233 and reflected from the sheet P to acquire the recording medium information. Thus, even with a construction that employs a single reading sensor 231, by switching the lighting of two light sources (first and second light sources 232 and 233), it is possible to acquire, during ink ejection timing adjustment, both opening information and recording medium information as mentioned above.

Instead, in the information acquiring step S2, the reading sensor 231 may acquire opening information and recording medium information in the following manner. As the information reading portion 23, the dedicated light source 232A and the reading sensor 231 shown in FIG. 10 can be used. The light source control portion 110e switches the amount of light emitted from the dedicated light source 232A in accordance with the reading mode of the reading sensor 231. The reading sensor 231 acquires opening information based on the amount of light received corresponding to a relatively small amount of light emitted from the dedicated light source 232A, and acquires recording medium information based on the amount of light received corresponding to a relatively large amount of light emitted from the dedicated light source 232A. The switching of the amount of light in accordance with the reading mode can be performed with similar timing as in ordinary printing shown in FIG. 11.

In this way, using a single dedicated light source 232A and switching the amount of light emitted from the dedicated light source 232A in accordance with the reading mode permits the reading sensor 231 to acquire information in accordance with the amount of light received as opening information or recording medium information. The principle of acquiring such information is as described previously with reference to FIG. 12.

[11. Modified Method of Adjusting Ink Ejection Timing]

Figure 17:
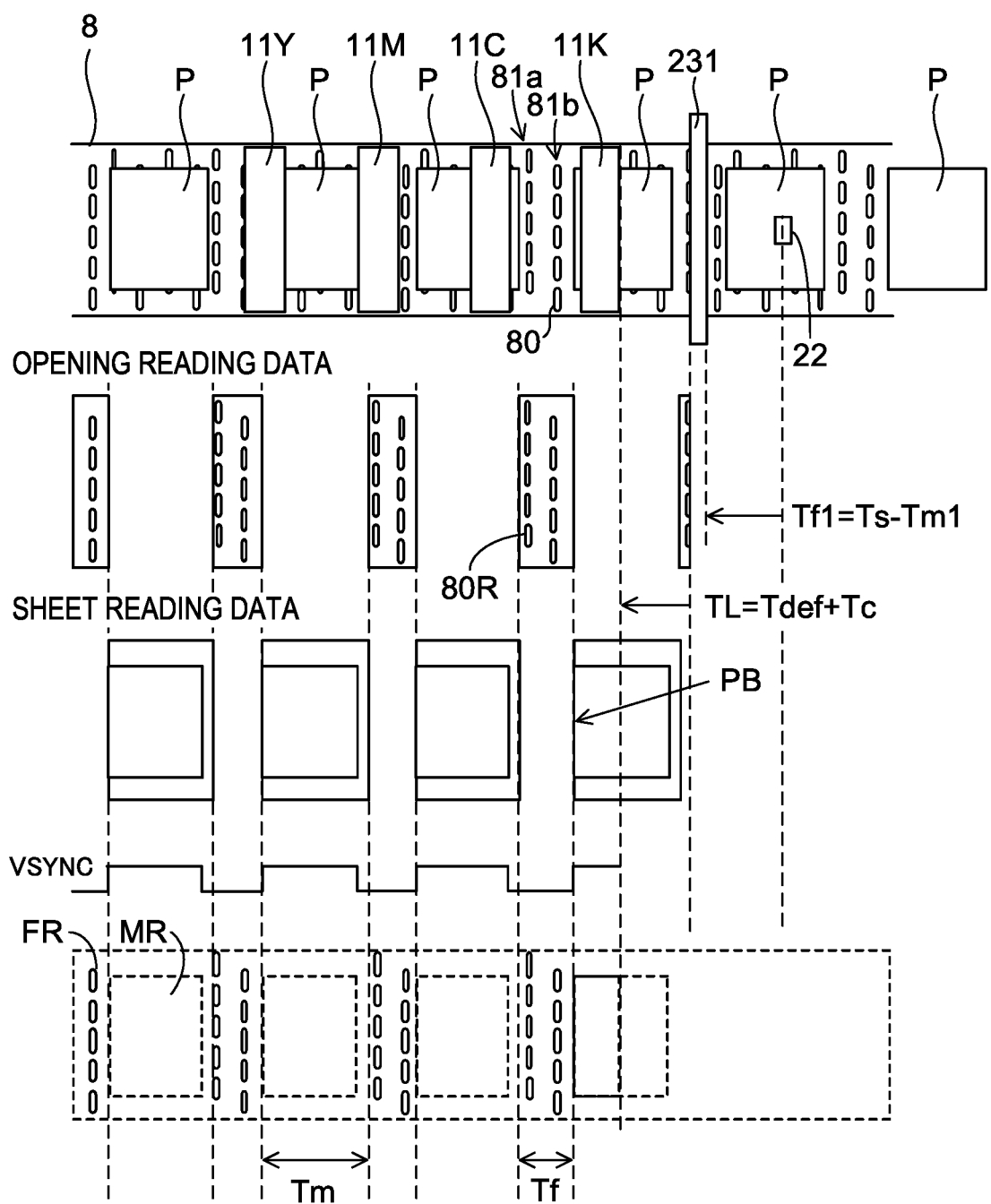
FIG. 17 is an illustrative diagram schematically showing opening information and recording medium information acquired by another example of the ink ejection timing adjustment method.

FIG. 17 is an illustrative diagram schematically showing opening information and recording medium information acquired by another method of ink ejection timing adjustment. In the information acquiring step S2 described previously, the reading mode switching control portion 110b may switch between the first and second reading modes alternately based on the result of sensing of the sheet P by the sheet sensor 22 in the sheet sensing step S1.

For example, in ink ejection timing adjustment, the reading mode switching control portion 110b may, based on the result of sensing of the sheet P by the sheet sensor 22 as in FIG. 9, set the reading mode of the reading sensor 231 to the second reading mode during the period in which the sheet P passes across the reading position of the reading sensor 231 (i.e., the period in which VSYNC is at high level) and to the first reading mode other than during the just-mentioned period (i.e., the period in which VSYNC is at low level).

Then during the period in which the sheet P passes across the reading position just under the reading sensor 231, the reading sensor 231 can be all the time operated in the second reading mode, and thus the reading sensor 231 can acquire recording medium information without a drop in resolution (e.g., at a resolution of 600 dpi). In the period other than the just-mentioned period, the reading sensor 231 can be all the time operated in the first reading mode, and thus the reading sensor 231 can acquire opening information without a drop in resolution (e.g., at a resolution of 600 dpi). That is, using the reading sensor 231 capable of monochrome reading at 600 dpi, it is possible to acquire opening information and recording medium information each at a high resolution of 600 dpi.

In particular, acquiring recording medium information at a resolution of 600 dpi helps raise the accuracy of the sensing of the leading end of the sheet P based on the recording medium information. It is then possible to accurately determine the time when, as the first conveying belt 8 turns, the leading end of the sheet P passes the reading position of the reading sensor 231, and to accurately adjust the ink ejection timing. That is, using sheet reading data at 600 dpi, it is possible to correct the ink ejection timing at an accuracy of 600 dpi.

The conveyance speed at which the first conveying belt 8 conveys the sheet P (the conveyance speed at which the sheet P is conveyed between the reading sensor 231 and the recording heads 17a to 17c) and the conveyance speed at which the sheet P is fed onto the first conveying belt 8 (e.g., the feed speed at which the pair of registration rollers 13 feeds the sheet P onto the first conveying belt 8) are usually controlled so as to be synchronous (equal). If for some reason a deviation (error) arises between those conveyance speeds, for example, before a transition from the first reading mode to the second reading mode the leading end of the sheet P may have passed the reading position of the reading sensor 231. If this happens, in the second reading mode, even if the reading sensor 231 acquires recording medium information, based on that recording medium information the leading end of the sheet P (i.e., the boundary between black and white) cannot be sensed. As an example FIG. 17 shows opening information (opening reading data) and recording medium information (sheet reading data) acquired when the conveyance speed at which the first conveying belt 8 conveys the sheet P is higher than the feed speed at which the pair of registration rollers 13 feeds the sheet P onto the first conveying belt 8.

With a case as described above taken into account, to reliably sense the leading end of the sheet P based on recording medium information, it is preferable that switching from the first reading mode to the second reading mode be performed in advance. Considering that the conveyance speed at which the first conveying belt 8 conveys the sheet P can be lower than the feed speed at which the pair of registration rollers 13 feeds the sheet P onto the first conveying belt 8, it is preferable that switching from the second reading mode to the first reading mode be performed somewhat later.

That is, in the information acquiring step S2, it is preferable that, based on the result of the sensing of the sheet P by the sheet sensor 22, the reading mode of the reading sensor 231 be switched from the first reading mode to the second reading mode before the sheet P (its leading end in particular) passes the reading position of the reading sensor 231 and be switched from the second reading mode to the first reading mode after the sheet P (its rear end in particular) has passed the reading position.

In that case, the delay period Tf1 (sec) after the sheet sensor 22 senses the sheet P until the reading mode of the reading sensor 231 is switched from the first reading mode to the second reading mode is given by formula (1) below, where the theoretical time for which the sheet P is conveyed between the sheet sensor 22 and the reading sensor 231 is represented by Ts (sec) and the time as a margin is represented by Tm1 (sec). Here the time Tm1 as a margin is the time allowed for after the reading mode is switched from the first reading mode to the second reading mode until the leading end of the sheet P passes the reading position.

$$Tf1 = Ts - Tm1 \quad (1)$$

Likewise, the delay period Tf2 (sec) after the sheet sensor 22 senses the sheet P until the reading mode of the reading sensor 231 is switched from the second reading mode to the first reading mode is given by formula (2) below, where the time as a margin is represented by Tm2 (sec). Here the time Tm2 as a margin is the time allowed for after the rear end of the sheet P passes the reading position until the reading mode is switched from the second reading mode to the first reading mode.

$$Tf2 = Ts + Tm2 \quad (1)$$

Here the distance between the sheet sensor 22 and the reading sensor 231 (even though the reading sensor 231 has fitting tolerance) is previously set at a design value. On the other hand, the speed at which the pair of registration rollers 13 feeds out the sheet P is approximately determined. Accordingly the theoretical time Ts (sec) can be calculated by dividing the just-mentioned distance by the just-mentioned feed speed. An error (difference in the conveyance time) ascribable to the fitting tolerance of the reading sensor 231 can be absorbed within the times Tm1 or Tm2 as a margin.

Figure 18:
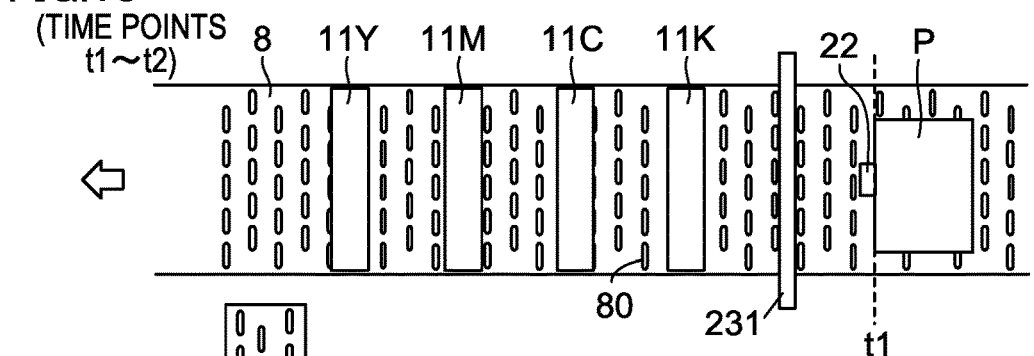
FIG. 18 is an illustrative diagram schematically showing a relationship between timing of switching of reading modes and opening information and recording medium information acquired.
Figure 18:
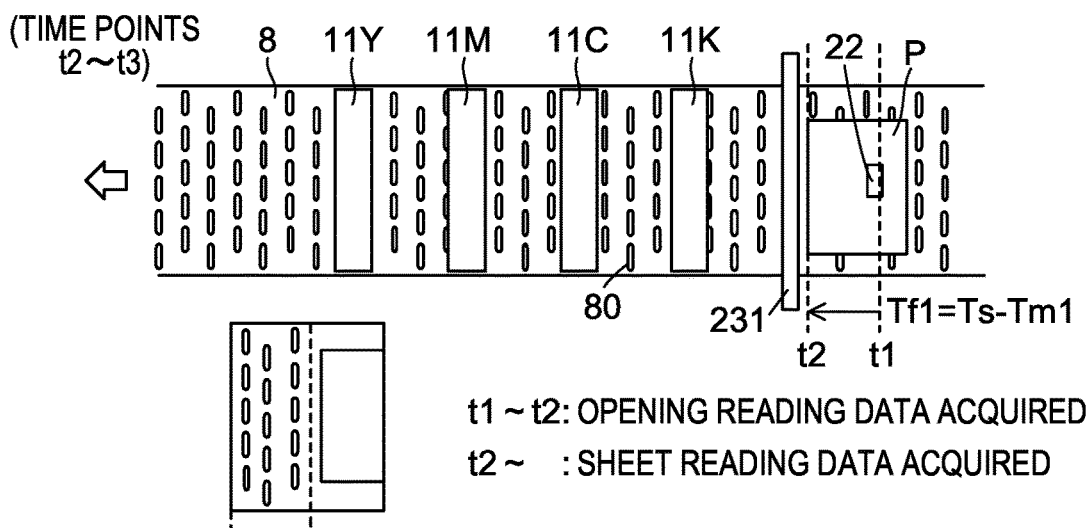
Figure 18:
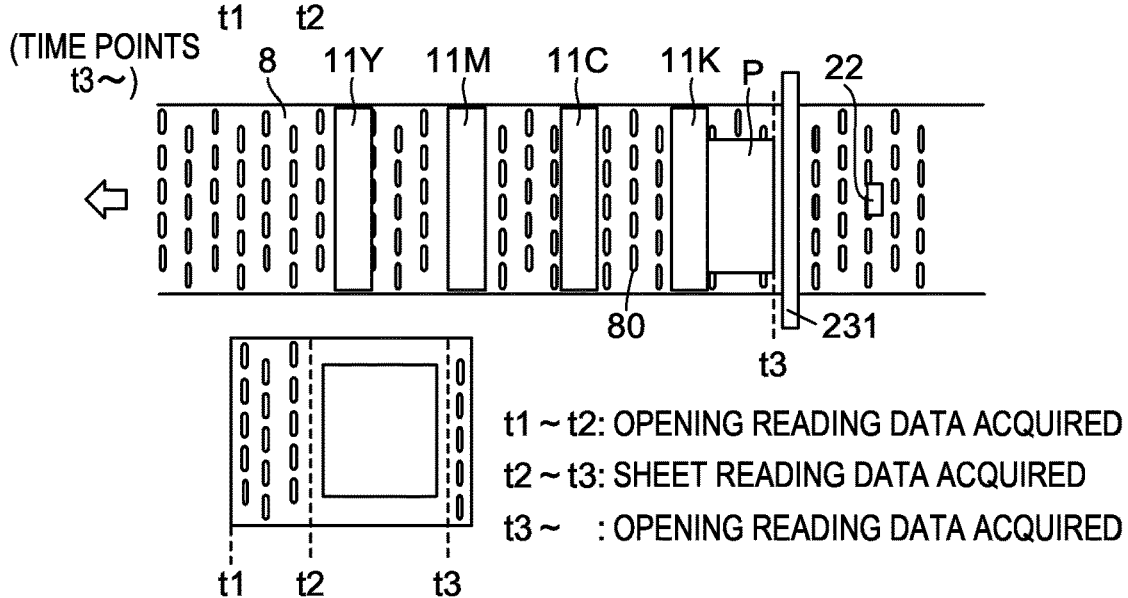

FIG. 18 schematically shows a relationship between timing of reading mode switching and opening information and recording medium information acquired. Here it is assumed that the reading mode is switched at time points t1 to t3. Time point t1 is when the leading end of the sheet P is sensed by the sheet sensor 22. Time point t2 is when the delay time Tf1 has elapsed since time point t1. Time point t3 is when the delay time Tf2 has elapsed since time point t1.

At time point t1 the reading mode switching control portion 110b switches the reading mode of the reading sensor 231 from the second reading mode to the first reading mode. Accordingly, from time point t1 to the next switching time point (t2), in the first reading mode the reading sensor 231 acquires opening information (opening reading data). If at time point t1 the reading mode of the reading sensor 231 is already set to the first reading mode (e.g., after completion of reading of the preceding sheet P), the first reading mode is retained.

At time point t2 the reading mode switching control portion 110b switches the reading mode of the reading sensor 231 from the first reading mode to the second reading mode. Accordingly, from time point t2 to the next switching time point (t3), in the second reading mode the reading sensor 231 acquires recording medium information (sheet reading data).

At time point t3 the reading mode switching control portion 110b switches the reading mode of the reading sensor 231 from the second reading mode back to the first reading mode. Accordingly, from time point t3 to the next switching time point, in the first reading mode the reading sensor 231 acquires opening information. Thereafter every time the leading end of the sheet P is sensed by the sheet sensor 22, operation similar to that from time point t1 to time point t3 is repeated.

As described above, switching from the first reading mode to the second reading mode is performed earlier by the margin Tm1 than at the time point (t1) when the sheet P passes the reading position of the reading sensor 231, and likewise switching from the second reading mode to the first reading mode is performed later by the margin Tm2 than after the sheet P has passed the reading position. Thus even if for some reason a difference arises between the conveyance speed at which the first conveying belt 8 conveys the sheet P (the conveyance speed at which the sheet P is conveyed between the reading sensor 231 and the recording heads 17a to 17c) and the conveyance speed at which the sheet P is fed onto the first conveying belt 8 (e.g., the feed speed at which the pair of registration rollers 13 feeds the sheet P onto the first conveying belt 8), it is possible to increase the probability of the period during which the sheet P passes across the reading position of the reading sensor 231 falling between time points t2 and t3. Thus with an increased probability the reading sensor 231 can read the sheet P starting at its leading end in the second reading mode. As a result the main control portion 110a can reliably sense the leading end of the sheet P based on the recording medium information acquired by the reading sensor 231 and this makes it possible to easily cope with a difference in conveyance speed as mentioned above.

Performing flushing between sheets requires a physical distance to be secured between sheets P that are conveyed successively. However, too long a margin Tm1 mentioned above results in too short a physical distance there. Thus the method in which the reading mode of the reading sensor 231 is switched from the first reading mode to the second reading mode somewhat earlier before the sheet P passes the reading position of the reading sensor 231 is not suitable to be applied to the control of the reading mode in ordinary printing after factory shipment. This is because too long a margin Tm1 requires the interval between the successively conveyed sheets P to be increased to secure a physical distance mentioned above necessary to perform sheet-interval flushing during ordinary printing, leading to lower productivity.

[12. Another Modified Method of Adjusting Ink Ejection Timing]

FIG. 19 is an illustrative diagram schematically showing opening information and recording medium information acquired by yet another method of ink ejection timing adjustment. In the information acquiring step S2 described previously, the reading mode switching control portion 110b may fix the reading mode of the reading sensor 231 to the second reading mode so that the reading sensor 231 acquires only recording medium information. Then in printing step S3, based on the recording medium information acquired by the reading sensor 231 in the second reading mode, the ejection control portion 110d recognize the position of the sheet P on the first conveying belt 8 and make the recording heads 17a to 17c eject ink to the sheet P with an ejection pattern previously set for ejecting ink toward the openings in the first conveying belt 8 thereby to print a test pattern on the sheet P.

With such control of the reading mode of the reading sensor 231, as compared with, for example, one in which in the information acquiring step S2 the first and second reading modes are switched alternately dot by dot to acquire opening information and recording medium information, it is possible to acquire recording medium information at a high resolution (e.g., at 600 dpi). It is thus possible to accurately sense the leading end of the sheet P based on the acquire recording medium information. As a result, as in the case shown in FIG. 17, it is possible to accurately adjust the ink ejection timing. That is, it is possible to correct the ink ejection timing at an accuracy of 600 dpi.

In the example in FIG. 19, ink is ejected to the sheet P with a previously set ejection pattern for flushing to print a test pattern. Also using a flushing pattern printed on the sheet P instead of a test pattern, a worker can enter an appropriate correction value based on the printed position of the test pattern. By entering the correction value, the worker can properly correct the ink ejection timing.

[9. Other Modifications]

While the above description deals with an example that uses a first conveying belt 8 in which groups of openings 82 (rows of openings 81) are formed at equal intervals in the conveying direction, also in a case where use is made of a first conveying belt 8 in which groups of openings 82 are formed at irregular (random) intervals in the conveying direction, it is possible to apply the information reading portion 23 according to the embodiment to acquire information on the sheet P and information on the openings 80.

While the above description deals with a case where a sheet P is conveyed in a state sucked onto the first conveying belt 8 by negative-pressure suction, instead the first conveying belt 8 may be electrostatically charged so that a sheet P is conveyed in a state electrostatically adsorbed onto the first conveying belt 8 (electrostatic adsorption system).

While the above description deals with an example that uses as an inkjet recording apparatus a color printer that records a color image using ink of four colors, also in a case where use is made of a monochrome printer that records a monochrome image using black ink, it is possible to apply flushing data generation and flushing control according to the embodiment.

As described above, with an ink ejection timing adjustment method according to the embodiment, on an inkjet recording apparatus that acquires opening information and recording medium information with a single reading sensor, it is possible to accurately adjust the ink ejection timing (ejection position) with consideration given to the fitting tolerance of the reading sensor. Thus, even with a construction that uses a single sensor, it is possible, during flushing in which ink is ejected to openings in a conveying belt, to reduce the likelihood of ink, due to the fitting tolerance of the reading sensor 231, landing around the openings and soiling the conveying belt.

While embodiments of the present disclosure are described above, they are in no way meant to limit the scope of the present disclosure; in implementing the present disclosure, many modifications are possible without departure from its spirit.

The present disclosure finds application in ink ejection timing adjustment on inkjet recording apparatuses such as inkjet printers.

What is claimed is:

1. A method of adjusting ejection timing of ink on an inkjet recording apparatus, the method comprising:
   an information acquiring step of, using a single reading sensor that reads openings formed in a conveying belt to acquire opening information in a first reading mode and that reads a recording medium fed onto the conveying belt to acquire recording medium information in a second reading mode, acquiring at least the recording medium information with the reading sensor;
   a printing step of, after, as a result of the conveying belt turning, a leading end of the recording medium detected based on the recording medium information passes a reading position of the reading sensor, when a default set time previously set as a time taken to convey the recording medium between the reading sensor and a recording head elapses, making the recording head eject ink to print a test pattern on the recording medium on the conveying belt;
   a calculating step of, by adding to the default set time a correction time corresponding to a correction value for ejection timing of the ink entered based on a printed position of the test pattern, calculating a delay time; and
   a setting step of setting the delay time as a predetermined time at lapse of which after, as a result of the conveying belt turning, the openings passes the reading position the recording head starts to eject ink to the openings.

2. The method according to claim 1, wherein
   in the information acquiring step, a reading mode of the reading sensor is switched alternately between the first and second reading modes.

3. The method according to claim 2, wherein
   in the information acquiring step, the first and second reading modes are switched alternately every integral multiple of a formation period for one dot as a unit of an image formed on the recording medium.

4. The method according to claim 3, wherein
   in the information acquiring step, the first and second reading modes are switched alternately every formation period for one dot as a unit of an image formed on the recording medium.

5. The method according to claim 2, further comprising:
   a sensing step of, before the information acquiring step, sensing the recording medium fed onto the conveying belt with a recording medium sensor,
   wherein
   in the information acquiring step, the first and second reading modes are switched alternately based on a result of sensing of the recording medium by the recording medium sensor.

6. The method according to claim 5, wherein
   in the information acquiring step, based on the result of sensing of the recording medium by the recording medium sensor, before the recording medium passes the reading position of the reading sensor, the reading mode of the reading sensor is switched from the first reading mode to the second reading mode and, after the recording medium passes the reading position, the reading mode is switched from the second reading mode to the first reading mode.

7. The method according to claim 1, wherein
   in the information acquiring step, a reading mode of the reading sensor is fixed to the second reading mode to acquire only the recording medium information, and
   in the printing step, the recording head is made to eject ink, with an ejection pattern for ejecting ink to the openings in the conveying belt, to the recording medium on the conveying belt recognized based on the recording medium information, thereby to print a test pattern on the recording medium.

8. The method according to claim 1, wherein
   in the information acquiring step, lighting of a first light source and a second light source is switched in accordance with a reading mode of the reading sensor, and
   the reading sensor,
      in the first reading mode, acquires the opening information by receiving light emitted from the first light source and transmitted through the openings and,
      in the second reading mode, acquires the recording medium by receiving light emitted from the second light source and reflected on the recording medium.

9. The method according to claim 1, wherein
   in the information acquiring step, an amount of light emitted from a dedicated light source located on a side of the conveying belt opposite from the reading sensor is switched in accordance with a reading mode of the reading sensor, and the reading sensor
- acquires the opening information based on an amount of light corresponding to a relatively small amount of light emitted from the dedicated light source and
- acquires the recording medium information based on an amount of light corresponding to a relatively large amount of light emitted from the dedicated light source.

* * * * *